US008687623B2

(12) United States Patent
Xiong et al.

(10) Patent No.: US 8,687,623 B2
(45) Date of Patent: Apr. 1, 2014

(54) METHOD AND SYSTEM OF CENTRALIZED CONTROL AND MANAGEMENT FOR FIBER CHANNEL OVER ETHERNET NETWORKS

(75) Inventors: Yijun Xiong, Plano, TX (US); Haotao Pan, Nanjing (CN); Yue Chang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/459,140

(22) Filed: Apr. 28, 2012

(65) Prior Publication Data

US 2012/0275467 A1  Nov. 1, 2012

Related U.S. Application Data

(60) Provisional application No. 61/480,671, filed on Apr. 29, 2011.

(51) Int. Cl.
*H04L 12/28* (2006.01)
*H04L 12/66* (2006.01)

(52) U.S. Cl.
USPC .................. 370/351; 370/431; 370/463

(58) Field of Classification Search
CPC .. H04L 49/506; H04L 47/6295; H04L 45/021
USPC ......... 370/229, 235, 236, 241, 252, 351, 389, 370/392, 400–401, 419, 431, 463
See application file for complete search history.

(56) References Cited

U.S. PATENT DOCUMENTS

| 6,842,423 | B1 | 1/2005 | Erimli et al. |
| 8,400,942 | B2 | 3/2013 | Pandit |
| 2004/0017808 | A1* | 1/2004 | Forbes et al. ................. 370/390 |
| 2007/0081454 | A1 | 4/2007 | Bergamasco et al. |
| 2008/0159277 | A1 | 7/2008 | Vobbilisetty et al. |
| 2009/0059937 | A1 | 3/2009 | Kanada |
| 2011/0064086 | A1* | 3/2011 | Xiong et al. .................. 370/401 |
| 2011/0274110 | A1* | 11/2011 | Mmmadi et al. .............. 370/392 |

(Continued)

FOREIGN PATENT DOCUMENTS

| CN | 101253729 A | 8/2008 |
| CN | 101378357 A | 3/2009 |

(Continued)

OTHER PUBLICATIONS

Interworking Task Group of IEEE 802.1, IEEE P802.1Q-REV/D1.3, Oct. 12, 2010, pp. 1-1371.*

(Continued)

*Primary Examiner* — Omar Ghowrwal
(74) *Attorney, Agent, or Firm* — Slater & Matsil, L.L.P.

(57) ABSTRACT

A first fiber channel over Ethernet (FCoE) data forwarder (FDF), comprising a memory coupled to a processor, wherein the memory comprises instructions that cause the processor to receive a base forwarding table from an FCoE controller and manager (FCM), wherein the FDF comprise a plurality of ports, and wherein the first FDF uses the base forwarding table to determine which of the ports to send a first FCoE data frame comprising fiber channel (FC) data, receive a second FCoE data frame comprising a media access control (MAC) address, a port identifier, and FC data, and update the base forwarding table using the MAC address and the port identifier.

16 Claims, 17 Drawing Sheets

(56) References Cited

U.S. PATENT DOCUMENTS

| | | | |
|---|---|---|---|
| 2011/0299391 | A1 | 12/2011 | Vobbilisetty et al. |
| 2012/0106957 | A1 | 5/2012 | Willeke et al. |
| 2012/0163376 | A1 | 6/2012 | Shukla et al. |
| 2012/0177370 | A1* | 7/2012 | Berman .................. 398/58 |
| 2012/0275339 | A1 | 11/2012 | Xiong |
| 2012/0275787 | A1 | 11/2012 | Xiong |

FOREIGN PATENT DOCUMENTS

| | | | |
|---|---|---|---|
| CN | 102025617 A | | 4/2011 |
| WO | 2012149503 A1 | | 11/2012 |
| WO | 2012149504 A1 | | 11/2012 |
| WO | 2012149505 A1 | | 11/2012 |

OTHER PUBLICATIONS

Wilson, S., et al., "Fibre Channel, Switch Fabric -5, (FC-SW-5) Rev 8.5," T11/Project 1822-D/Rev 8.5, INCITS Working Draft Proposed, American National Standard for Information Technology, Jun. 3, 2009, 333 pages.

Office Action dated Apr. 24, 2013, 33 pages, U.S. Appl. No. 13/459,142, filed Apr. 28, 2012.

Foreign Communication From a Counterpart Application, PCT Application PCT/CN2012/070002, International Search Report dated Apr. 29, 2012, 3 pages.

Silvano Gai, et al., "FCoE Topologies, Understanding FCoE Networks Without Getting Trapped in a Klein Bottel", Cisco, T11/10-130v3, Dec. 2010, 24 pages.

Foreign Communication From a Related Counterpart Application, International Search Report, PCT/US2012/035704, Sep. 5, 2012, 4 pages.

Foreign Communication From a Related Counterpart Application, Written Opinion, PCT/US2012/035704, Sep. 5, 2012, 7 pages.

Foreign Communication From a Related Counterpart Application, International Search Report, PCT/US2012/035705, Sep. 5, 2012, 3 pages.

Foreign Communication From a Related Counterpart Application, Written Opinion, PCT/US2012/035705, Sep. 5, 2012, 5 pages.

Foreign Communication From a Related Counterpart Application, International Search Report, PCT/US2012/035706, Sep. 5, 2012, 3 pages.

Foreign Communication From a Related Counterpart Application, Written Opinion, PCT/US2012/035706, Sep. 5, 2012, 8 pages.

Fibre Channel Backbone (FC-BB-5), INCITS T11 Committee, Rev 2.0, Jun. 4, 2009, 180 pages.

Claudio Desanti, "FDF Routing", T11/10-465v0, Oct. 2010, 34 pages.

"Virtual Domain", T11/10-345v1, 2010, 40 pages.

"Fibre Channel Switch Fabric (FC-SW-5)", INCITS T11 Committee, Rev 8.0, Nov. 22, 2006, 329 pages.

Office Action for U.S. Appl. No. 13/459,142, mailed Nov. 6, 2013, 35 pages.

"Media Access Control (MAC) Bridges and Virtual Bridge Local Area Networks," IEEE Standard for Local and metropolitan area networks, 802.1Q, Aug. 31, 2011, 1365 pages.

* cited by examiner

| Item | Size (in bytes) |
|---|---|
| SW_ILS code | 2 |
| Payload length | 2 |
| Primary FCM Switch_Name | 8 |
| Reserved | 3 |
| Primary FCM Domain_ID | 1 |
| Secondary FCM Switch_Name | 8 |
| Reserved | 3 |
| Secondary FCM Domain_ID | 1 |
| Fabric_Name | 8 |
| Number of Domain_IDs (n) | 4 |
| Domain_ID entry #1 | 4 |
| o o o | |
| Domain_ID entry #n | 4 |

| Item | Size (in bytes) |
|---|---|
| SW_ILS code | 2 |
| Flag | 2 |
| Originating Switch_Name | 8 |
| Primary FCM Switch_Name | 8 |
| Reserved | 3 |
| Primary FCM Domain_ID | 1 |
| Secondary FCM Switch_Name | 8 |
| Reserved | 3 |
| Secondary FCM Domain_ID | 1 |
| Fabric_Name | 8 |
| Reserved | 3 |
| Hop Count | 1 |

- 960 SW_ILS code
- 962 Flag
- 964 Originating Switch_Name
- 966 Primary FCM Switch_Name
- 968 Reserved
- 970 Primary FCM Domain_ID
- 972 Secondary FCM Switch_Name
- 968 Reserved
- 974 Secondary FCM Domain_ID
- 976 Fabric_Name
- 968 Reserved
- 978 Hop Count Bit 0: announcement
Bit 1: primary FCM unreachable
Bit 2: flooding
Bit 3 - Bit 15: reserved

| Item | Size (in bytes) |
|---|---|
| SW_ILS code (0200h) | 2 |
| Flag | 2 |
| Responding Switch_Name | 8 |
| Primary FCM Switch_Name | 8 |
| Reserved | 3 |
| Primary FCM Domain_ID | 1 |
| Secondary FCM Switch_Name | 8 |
| Reserved | 3 |
| Secondary FCM Domain_ID | 1 |
| Fabric_Name | 8 |
| Reserved | 3 |
| Hop Count | 1 |

- 1060 SW_ILS code (0200h)
- 1062 Flag
- 1064 Responding Switch_Name
- 1066 Primary FCM Switch_Name
- 1068 Reserved
- 1070 Primary FCM Domain_ID
- 1072 Secondary FCM Switch_Name
- 1068 Reserved
- 1074 Secondary FCM Domain_ID
- 1076 Fabric_Name
- 1068 Reserved
- 1078 Hop Count

*FIG. 10*

| Item | Size (in bytes) |
|---|---|
| SW_ILS code | 4 |
| Requesting Switch_Name | 8 |
| Primary FCM Switch_Name | 8 |

*FIG. 11*

| Item | Size (in bytes) |
|---|---|
| SW_ILS code (02000000h) | 4 |
| Primary FCM Switch_Name | 8 |
| Recipient FDF Switch_Name | 8 |
| Reserved | 1 |
| Granted FDF_ID | 3 |

*FIG. 12*

| Item | Size (in bytes) |
|---|---|
| SW_ILS code | 4 |
| Primary FCM Switch_Name | 8 |
| Recipient FDF Switch_Name | 8 |

| Item | Size (in bytes) |
|---|---|
| SW_ILS code (02h) | 1 |
| Link descriptor length (in bytes) | 1 |
| Payload length (in bytes) | 2 |
| Responding FDF Switch_Name | 8 |
| Primary FCM Switch_Name | 8 |
| Reserved | 2 |
| Number of Links (L) | 2 |
| Link descriptor #1 | |
| ... | |
| Link descriptor #1 | |

Link descriptor format

| Item | Size (in bytes) |
|---|---|
| Remote FDF/FCM Switch_Name | 8 |
| Local port FCF-MAC | 6 |
| Remote port FCF-MAC | 6 |
| Reserved | 2 |
| Cost | 2 |

1600

| N_Port_ID Prefix | Output port MAC | Next hop MAC | Cost |
|---|---|---|---|
| 1.0.0/8 | FCF-MAC-A2 | FCF-MAC-Y1 | 1 |
| 2.0.0/8 | FCF-MAC-A1 | FCF-MAC-X1 | 1 |
| 3.2.2/24 | FCF-MAC-A6 | FCF-MAC-B6 | 1 |
| 3.2.3/24 | FCF-MAC-A3 | FCF-MAC-C1 | 1 |
| 3.2.4/24 | FCF-MAC-A4 | FCF-MAC-D1 | 1 |
| 3.2.5/24 | FCF-MAC-A5 | FCF-MAC-E1 | 1 |
| 1.0.0/8 | FCF-MAC-A6 | FCF-MAC-B6 | 2 |
| 2.0.0/8 | FCF-MAC-A6 | FCF-MAC-B6 | 2 |
| 3.2.2/24 | FCF-MAC-A3 | FCF-MAC-C1 | 2 |
| 3.2.2/24 | FCF-MAC-A4 | FCF-MAC-D1 | 2 |
| 3.2.2/24 | FCF-MAC-A5 | FCF-MAC-E1 | 2 |
| 3.2.3/24 | FCF-MAC-A6 | FCF-MAC-B6 | 2 |
| 3.2.4/15 | FCF-MAC-A6 | FCF-MAC-B6 | 2 |
| 3.2.5/15 | FCF-MAC-A6 | FCF-MAC-B6 | 2 |

*FIG. 16*

| Item | Size (in bytes) |
|---|---|
| SW_ILS code | 1 |
| Forwarding table entry length | 1 |
| Payload length (in bytes) | 2 |
| Primary FCM Switch_Name | 8 |
| Recipient FDF/FCM Switch_Name | 8 |
| Broadcast tree uplink port MAC | 6 |
| Number of broadcast tree downlink q | 2 |
| Broadcast tree downlink port MAC #1 | 6 |
| Reserved | 2 |
| ∘ ∘ ∘ | |
| Broadcast tree downlink port MAC #q | 6 |
| Reserved | 2 |
| Number of forwarding table entries (h) | 4 |
| Forwarding table entry #1 | Forwarding table entry length |
| ∘ ∘ ∘ | |
| Forwarding table entry #h | Forwarding table entry length |

Forwarding table entry format

| Item | Size (in bytes) |
|---|---|
| N_Port_ID address | 3 |
| Prefix length | 1 |
| Output port MAC | 6 |
| Next port MAC | 6 |
| Reserved | 2 |
| Cost | 2 |

| N_Port_ID Prefix | Output port MAC | Next hop MAC | Cost |
|---|---|---|---|
| 3.8.0/15 | FCF-MAC-A3 | FCF-MAC-C1 | 1 |
| 4.2.0/15 | FCF-MAC-A4 | FCF-MAC-D1 | 1 |
| 4.4.0/15 | FCF-MAC-A5 | FCF-MAC-E1 | 1 |
| 3.8.0/15 | FCF-MAC-A6 | FCF-MAC-B6 | 2 |
| 4.2.0/15 | FCF-MAC-A6 | FCF-MAC-B6 | 2 |
| 4.4.0/15 | FCF-MAC-A6 | FCF-MAC-B6 | 2 |

FIG. 21

| Item | Size (in bytes) |
|---|---|
| SW_ILS code | 1 |
| Forwarding table entry length (in bytes) | 1 |
| Payload length (in bytes) | 2 |
| Primary FCM Switch_Name | 8 |
| Reserved | 2 |
| Number of N_Port_ID ranges (h) | 2 |
| N_Port_ID range entry #1 | Forwarding table entry length |
| ••• | |
| N_Port_ID range entry #h | Forwarding table entry length |

N_Port_ID range entry format

| Item | Size (in bytes) |
|---|---|
| Flag | 1 |
| FDF_ID | 3 |
| N_Port_ID address | 3 |
| Prefix length | 1 |

METHOD AND SYSTEM OF CENTRALIZED CONTROL AND MANAGEMENT FOR FIBER CHANNEL OVER ETHERNET NETWORKS

CROSS-REFERENCE TO RELATED APPLICATIONS

This application claims the benefit of U.S. Provisional Patent Application No. 61/480,671 filed Apr. 29, 2011, entitled "Method and System of Centralized Control and Management for Fiber Channel over Ethernet Networks," which is incorporated herein by reference.

This application relates to the following co-pending and commonly assigned patent applications: Ser. No. 13/459,139, filed Apr. 28, 2012, entitled "Method and System of Centralized Control and Management for Fiber Channel Over Ethernet Networks" and Ser. No. 13/459,142, filed Apr. 28, 2012, entitled "Method and System of Centralized Control and Management for Fiber Channel Over Ethernet Networks."

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fiber Channel over Ethernet (FCoE) is a technology used for transporting Fiber Channel (FC) frames over Ethernet, which is currently being standardized at the Technical Committee for Fiber Channel (T11) of the International Committee for Information Technology Standards (INCITS). FCoE technology enables users to establish a unified network infrastructure for data centers based on Ethernet. The capability to transport FC data on top of an Ethernet network alleviates the problem of maintaining a separate storage area network (SAN) and Ethernet network. As a result, instituting a single, converged network reduces the complexity, space, and cost necessary to maintain the network infrastructure.

The FCoE technology replaces the FC physical (FC-0) and FC coding (FC-1) layers of the FC architecture with the Ethernet physical and Media Access Control (MAC) layers of the Ethernet architecture without altering the FC framing (FC-2) layer and higher layers. Using the FCoE technology, the FC frames and standard Ethernet frames can be transported independently in the network. Accordingly, the FC frames are mapped over Ethernet frames and then transmitted on Ethernet links, and thus provides substantially seamless integration between FC based networks and Ethernet based networks.

SUMMARY

In one embodiment, the disclosure includes a first FCoE data forwarder (FDF), comprising a memory coupled to a processor, wherein the memory comprises instructions that cause the processor to receive a base forwarding table from an FCoE controller and manager (FCM), wherein the FDF comprise a plurality of ports, and wherein the first FDF uses the base forwarding table to determine which of the ports to send a first FCoE data frame comprising FC data, receive a second FCoE data frame comprising a media access control (MAC) address, a port identifier, and FC data, and update the base forwarding table using the MAC address and the port identifier.

In yet another embodiment, the disclosure includes a FCoE network, comprising an FCM, a first FDF coupled to the FCM, and a second FDF coupled to the first FDF such that the first FDF is positioned between the FCM and the second FDF, wherein the FCM sends to the first FDF a first FDF Forwarding Table (FFT) request that comprises a base forwarding table, wherein the first FDF sends to the FCM a first FDF acceptance indicating that the base forwarding table was correctly received, and wherein the FDF updates the first forwarding table using port information and MAC address obtained from FCoE data frames comprising FC data.

In a third embodiment, the disclosure includes a method implemented in a first FDF coupled to an FCM, the method comprising receiving from the FCM a first N_Port identifier range allocation (NRA) request comprises a base forwarding table, sending to the FCM a first NRA acceptance indicating that the base forwarding table was received, receiving a FCoE data frame comprising a MAC address, a port identifier, and FC data, and updating the base forwarding table using the MAC address and the port identifier.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a table describing the elements and size of an embodiment of a Domain_ID Set Announcement Switch fabric Internal Link Services (DSA SW_ILS) frame.

FIG. 9 is a table describing the elements and size of an embodiment of a Controlling FDF Information SW_ILS (CFI) request.

FIG. 10 is a table describing the elements and size of an embodiment of a CFI Switch fabric Accept (CFI SW_ACC) frame.

FIG. 11 is a table describing the elements and size of an embodiment of a Request FDF_ID (RFI) request.

FIG. 12 is a table describing the elements and size of an embodiment of a RFI SW_ACC frame.

FIG. 13 is a table describing the elements and size of an embodiment of an Adjacency Information Collection SW_ILS (AIC) request.

FIG. 14 is a table describing the elements and size of an embodiment of an AIC SW_ACC frame.

FIG. 16 is an embodiment of a base forwarding table.

FIG. 19 is a table describing the elements and size of an embodiment of the FDF Forwarding Table SW_ILS (FFT) request.

FIG. 20 is an example of new entries used to update the base forwarding table.

FIG. 21 is a table describing the elements and size of an embodiment of N_Port_ID Range Allocation (NRA) request.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

FCoE switches or Fiber Channel Forwarders (FCFs), as defined in Rev. 2.00 for Fiber Channel Backbone (FC-BB-5) of the INCITS T11, published Jun. 4, 2009, which is incorporated herein as if reproduced by its entirety, provide the connectivity necessary to implement FC switching functions and Ethernet bridging functions. However, relying only on FCFs limits the network scalability to the number of FCFs/Domain IDs available and distributed FC fabric services. To improve network scalability, FCFs can be replaced with a combination of controlling FCFs and FDFs, as described in T11/10-465v0, published October 2010, which is incorporated herein as if reproduced by its entirety, to form distributed FCFs. In a distributed FCF, the controlling FCF provides instructions to multiple FDFs on how to forward FCoE frames. Implementing distributed FCFs reduce the overall number of FCFs needed in a system. However, the use of distributed FCFs still relies on expensive FCFs to implement an FCoE network that will still have scalability limits based on the number of FCFs.

Disclosed herein is a method of centralized control and management for an FCoE network. The FCoE network may layer and virtualize the FC constructs over Ethernet. The FCoE network may comprise a plurality of FCoE switches coupled to a plurality of ENodes in a plurality of virtual domains. The FCoE switches in such an FCoE network may lack the control plane functions found in the FCFs (e.g. the FCoE switches only operate in the data plane), and thus are called FDFs. The control and management plane functions that would otherwise be in the FDF are instead located in a physically or logically centralized FCM node. The FCM may be considered an FCF that does not forward FCoE data frames (e.g. the FCM only operates in the control plane). As such, the FCM may manage the process of discovering the topology of the FCoE network and the creation and updating of FDF forwarding tables used for FCoE frame forwarding. The FCoE frame forwarding table may be based on the edge FDF MAC address. The FCoE network may utilize a variety of interconnections to connect FCMs and FDFs, such as a lossless Ethernet Local Area Network (LAN) or a point-to-point Ethernet connection. The FCoE network may also have arbitrary FDF topology (e.g. single-hop FDFs) with multiple FCMs, each connected to a plurality of FDFs.

Figure 1:
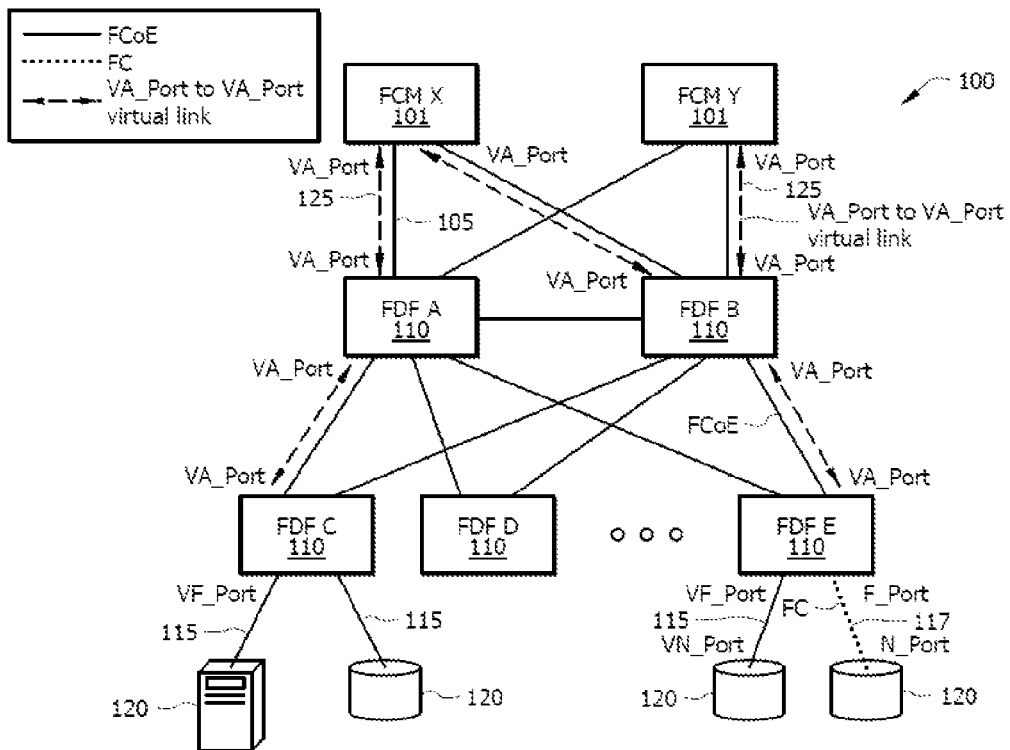
FIG. 1 is a schematic diagram of framework of an embodiment of an FCoE network with a centralized control and management system.

FIG. 1 is an illustration of an embodiment of an FCoE network 100 with a centralized control and management system. The FCoE network 100 may comprise a plurality of FCMs 101 and a plurality of FDFs 110. FIG. 1 depicts a primary FCM Y 101 and a backup or secondary FCM X 101 coupled to two FDFs 110. FCMs 101 may be physically coupled to FDFs 110 via point-to-point Ethernet links 105 to transmit FCoE Initialization Protocol (FIP) and FCoE frames, as shown in FIG. 1. The FCMs 101 may be coupled to the same FDFs 110 (as shown in FIG. 1) or may be coupled to different FDFs 110. FIG. 1 also illustrates that the FCoE network 100 may have a multi-hop FDF topology where the various FDFs 110 may be coupled to FCMs 101, other FDFs 110, and/or ENodes 120. For example, FDF D 110 is not coupled to FCMs 101 and instead is coupled to only FDFs A and B 110. Additionally, FDFs C and E 110 are coupled to FDFs A and B 110 and to a plurality of ENodes 120. In other embodiments, the FDFs 110 may be coupled to FCMs 101 and other FDFs 110, only to other FDFs 110, or to only FCMs 101 and ENodes 120.

FCM 101 may be any device configured to control and provide FC management plane functions and fabric services that are typically found in an FCF. Examples of FC management plane functions include name server, zoning, Registered State Change Notification (RSCN), and N_Port_ID allocation. Specifically, FCM 101 manages the process of discovering the topology of the FCoE network 100, and creates and updates FDF forwarding tables used for FCoE frame forwarding. FCM 101 may be implemented in, but not limited to, a physical or virtual server, in an appliance, or even within a small number of FDFs in the FCoE network 100.

FCM 101 may comprise a plurality of Virtual Adjacent Ports (VA_Ports) and a plurality of Virtual E_Ports (VE_Ports). FCM 101 may not comprise of other types FC/FCoE ports (e.g. Virtual F_ports (VF_Ports), Virtual N_ports (VN_ports), F_Ports, and N_Ports). The VA_Port may be used to communicate with directly connected FDFs 110 (e.g. adjacent FDFs 110). In FIG. 1, each FCM 101 may use VA_Port to VA_Port virtual links 125 to communicate with its adjacent FDFs 110. VA_Port to VA_Port virtual links 125 may be instantiated between the FDFs 110 and FCMs 101. FCMs 101 may also communicate with each other via VE_Port or regular Internet Protocol (IP)/Ethernet (e.g. shown in FIG. 2).

FDF 110 may be any device that operates only in the data plane (e.g. transferring FC and FCoE frames). FDFs 110 may act only as FCoE data forwarders and may not retain any of the control and management functions associated with an FCF or FCM 101. FDFs 110 may be further configured to support regular Ethernet functions as described in Rev. 1.3 for the Institute of Electrical and Electronics Engineers (IEEE) P802.1Q standard, published Oct. 12, 2010, which is incorporated herein by reference. In the virtual domain, FDF 110 may comprise a plurality of VA_Ports and VF_Ports. While FIG. 1 illustrates the VA_Port to VA_Port virtual link 125 between FDF A 110 and FDF C 110, VA_Port to VA_Port virtual links 125 may be instantiated between FDFs 110 to enable communication with any directly connected FDFs 110. FDFs 110 may also instantiate VF_Port to VN_Port virtual links 115 to communicate with ENodes 120, which may exchange FCoE frames. In the FC domain, the FDF 110 may use F_Ports to exchange FC frames with the ENodes' 120 N_Ports, thereby creating an FC connection 117.

ENode 120 may be any device configured to support FC or FCoE interfaces. ENodes 120 may comprise N_Ports (e.g. for FC) or VN_Ports (e.g. for FCoE), but typically do not contain both. As shown in FIG. 1, ENodes 120 may be coupled to FDFs 110 using N_Ports for FC connections and VN_Ports for FCoE connections. ENodes 120 may be, but are not limited to, hosts, servers, storage devices or other types of end devices that may originate data into or receive data from the FCoE network 100. As such, ENodes 120 are not typically part of the FCoE network 100.

The various devices in the FCoE network 100 may comprise a variety of different ports. In the FC domain of the FCoE network 100, FDFs 110 may comprise F_Ports that communicate FC data via fiber channels to N_Ports on the ENodes 120. E_Ports are FC ports on an FCoE switch that can be used to send FC data between the switches. In the FCoE domain, the FDFs 110 and FCMs 101 may comprise VF_Ports, and VE_Ports. Specifically, VE_Ports may be created on an FCoE switch (e.g. FDFs 110 and/or FCMs 101) to enable communication with another FCoE switch. A VF_port may be used to establish an FCoE connection with ENode 120. FCM 101 may comprise a plurality of VE_ports to establish communication with other FCMs 101. FDFs 110 and/or FCMs 101 may also comprise VA_Ports, which are similar to VE_ports except that VA_ports function inside the virtual domain to establish links for FDFs 110. FCoE frames may be exchanged at any of the VF_ports, VE_ports, and VA_ports.

Figure 2:
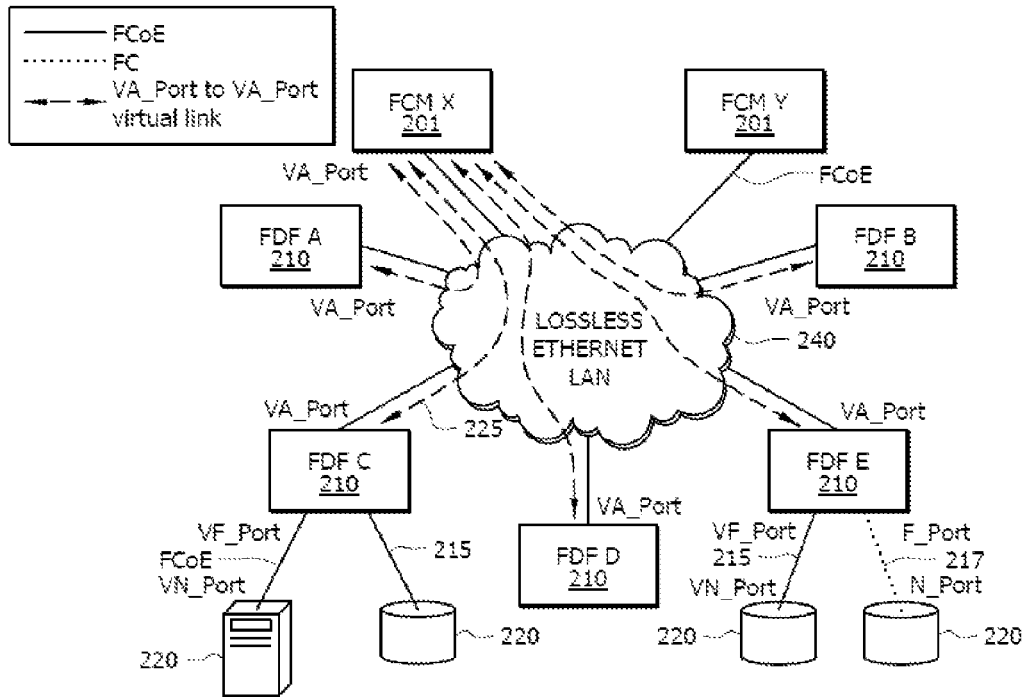
FIG. 2 is a schematic diagram of a framework of another embodiment of an FCoE network with a centralized control and management system.

FIG. 2 is an illustration of a second embodiment of an FCoE network with a centralized control and management system using a lossless Ethernet LAN 240. The FCoE network in FIG. 2 is substantially the same as the network in FIG. 1 with the exception that FIG. 2 uses at least one FCoE lossless Ethernet LAN 240. FIG. 2 illustrates that the FCoE network may comprise a single-hop FDF topology. In other words, with the lossless Ethernet LAN 240, FCM 201 may potentially be connected to all the FDFs 210 in the FCoE network. A full mesh of VA_Port to VA_Port virtual links may be instantiated between FCM 201 and FDFs 210 as they connect to the same lossless Ethernet LAN 240. As shown in FIG. 2, the FCM 201 may have five VA_Ports, each of which has a VA_Port to VA_Port virtual link to a different FDF 210. Analogous to FIG. 1, FIG. 2 illustrates that VF_Port to VN_Port links 215 and FC connections 217 may be established between FDFs 210 and ENodes 220.

Figure 3:
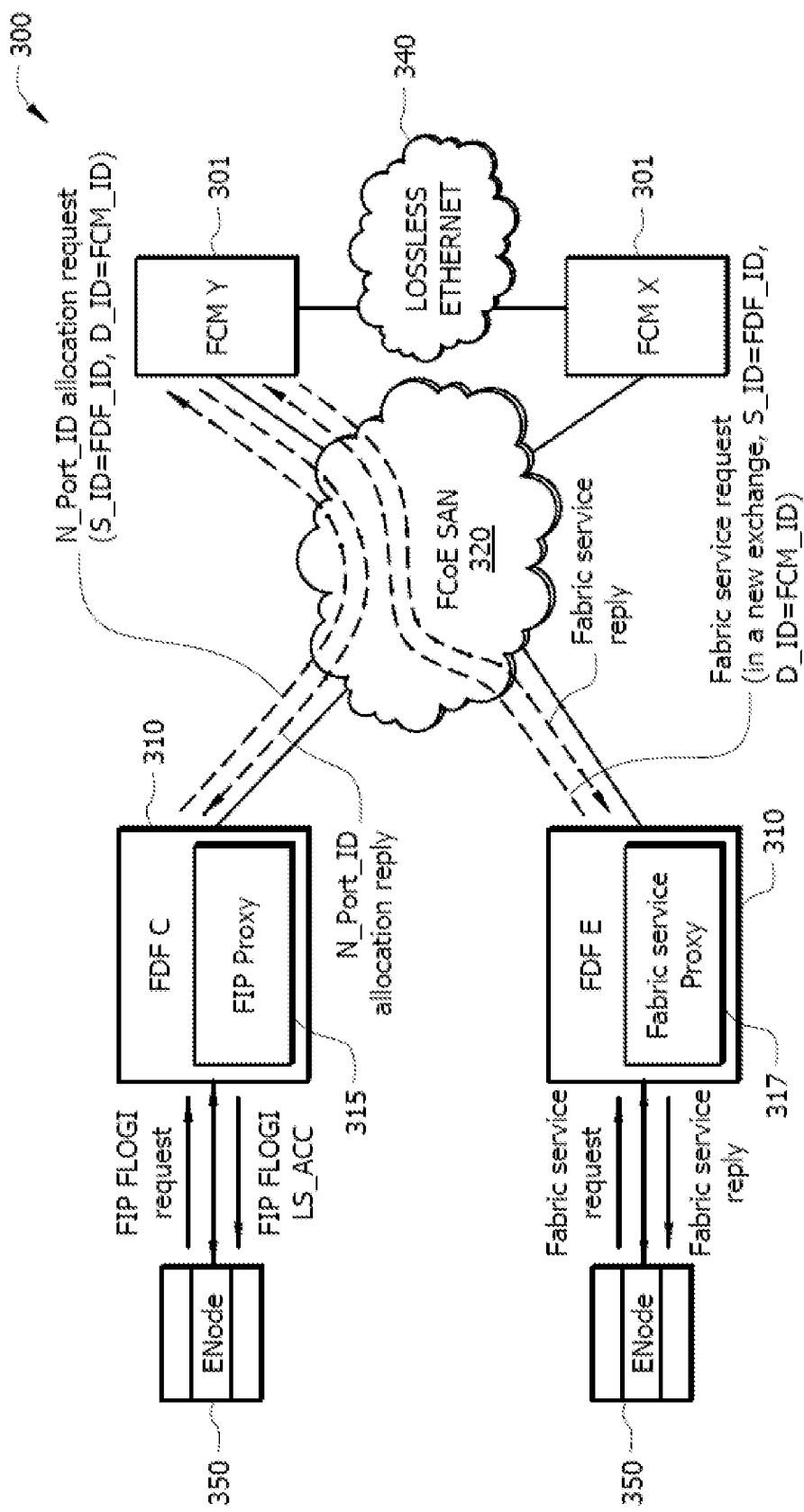
FIG. 3 is a schematic diagram of an embodiment of an FCoE network using inband communication between FDFs and FCMs.

The FCMs and FDFs in the FCoE network may communicate through a plurality of approaches. FIG. 3 illustrates an embodiment of an FCoE network 300 using inband communication between FDFs 310 and FCMs 301. The inband approach means that the FCoE network establishes communication between FDFs 310 and FCMs 301 using FC protocols with FCoE encapsulation or FCoE SAN 320. Therefore, communication protocols, such as topology discovery, FDF_ID and N_Port_ID assignment, FDF forwarding table distribution, and N_Port_ID range allocation information distribution are done via SW_ILSs as defined in Revision 8.5 for FC-SW-5 of the INCITS T11, published Jun. 4, 2009, which is incorporated herein as if reproduced by its entirety. FCMs 301 may be able to communicate with each other outside the FCoE SAN 320 using a lossless Ethernet LAN 340. The inband approach may be used in a virtual domain to support multi-hop amongst FDFs 310. More detailed examples of the inband method are presented below.

The top half of FIG. 3 illustrates a process of how FCoE service requests may be implemented using the inband approach. FDF C 310 may comprise a FIP proxy 315, which may be used to handle fabric login (FLOGI) and fabric logout (LOGO). When FDF C 310 receives a FIP FLOGI request from an ENode 350, it may terminate the request and send a new N_Port_ID allocation SW_ILS or N_Port_ID allocation request to FCM Y 301 using the FCoE SAN 320. On receipt of N_Port_ID allocation request, FCM Y 301 may send an N_Port_ID allocation Accept or N_Port_ID allocation reply through the FCoE SAN. Afterwards, FDF C 310 sends FIP FLOGI link service accept (LS_ACC) to ENode 350. Through the N_Port ID allocation process, FCoE frames may be used in the communication between the FDF 310 and FCM 301. The N_Port ID request allocation process will be discussed more in detail later.

The bottom half of FIG. 3 illustrates a process of how FC requests are handled using the inband method. FDF E 310 may comprise a fabric service proxy 317, which handles fabric service requests. Fabric service requests may be sent to well-known address like FFFFFDh (fabric controller), FFFFFCh (directory service), or FFFFFAh (management service), etc. When FDF E 310 receives a fabric service request, FDF E 310 may terminate the request and generate a new fabric service request in a new exchange to FCM Y 301 using the FCoE SAN 320. FDF E 310 may use its FDF_ID as Source_ID (S_ID) and the FCM_ID as the Destination_ID (D_ID) in the FCoE frames of the new request. The new fabric service request sent by FDF E 310 may comprise the same frame information as the original fabric service request from ENode 350 and other related information that FCM Y 301 may need in order to process the request (e.g., requesting FDF Switch_Name, primary FCM Switch_Name, Name of VF_Port, F_Port that receives the original request, etc.). Afterwards, FCM Y 301 may send a fabric service reply back to FDF E 310 in an FCoE frame. FDF E 310 will then forward the fabric service reply back to ENode 350. Subsequent communication exchanges between FCMs 301 with FDF E 310 may be implemented using FCoE frames.

Figure 4:
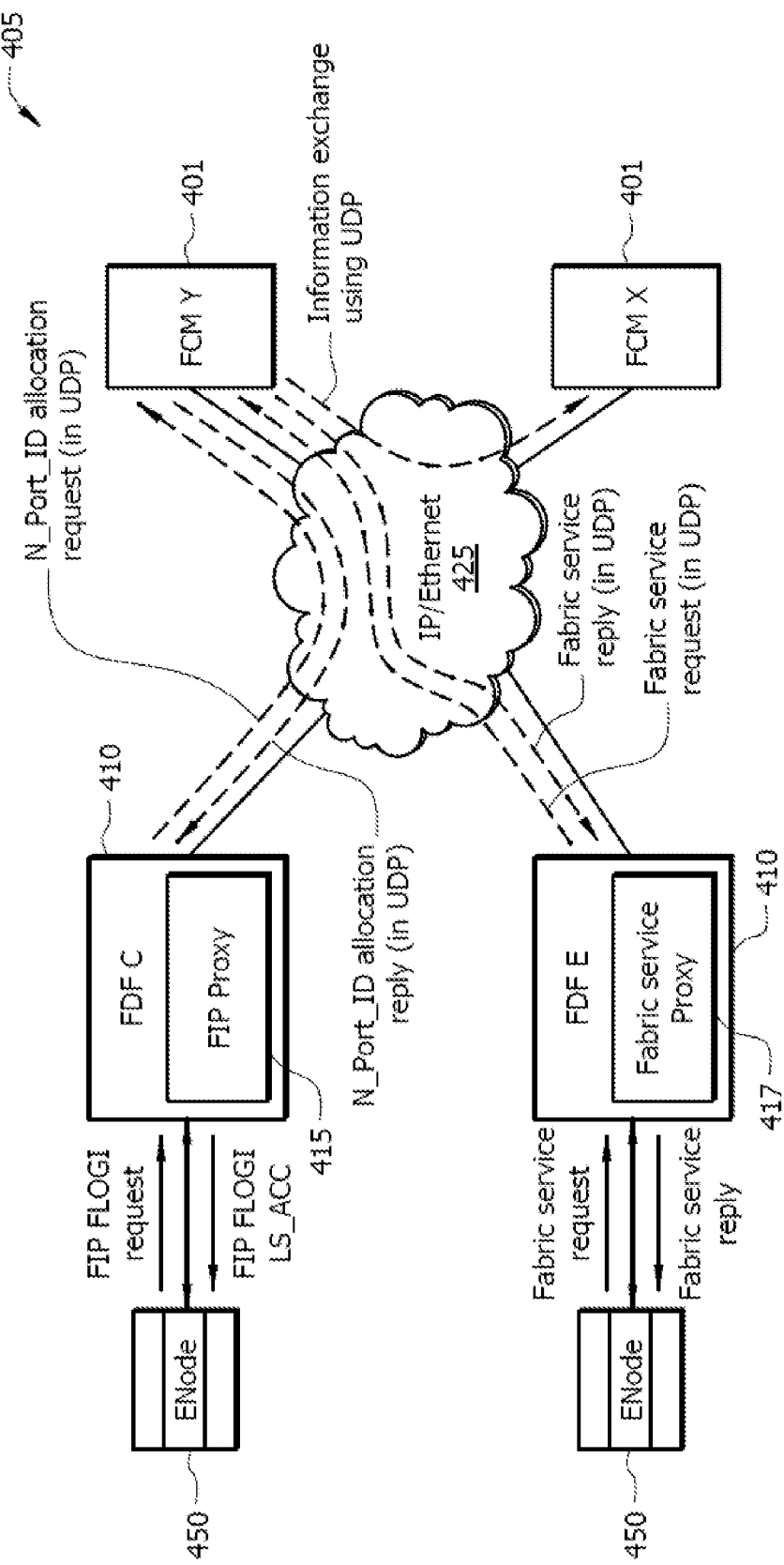
FIG. 4 is a schematic diagram of an embodiment of an FCoE network using outband communication between FDFs and FCMs.

FIG. 4 illustrates an embodiment of an FCoE network 405 uses outband communication FDFs 410 and FCMs 401. The outband approach means that FCMs 401 use a management network 425, which may be IP/Ethernet based, to communicate with FDFs 410, either directly or via Network Management System (NMS). FIG. 4 illustrates the transmission of User Datagram Protocol (UDP) packets, but any IP/Ethernet based protocols may be used in the outband approach. Examples of IP protocols may be Transmission Control Protocol (TCP) or UDP. The management network 225 may be a separate physical network from FCoE SAN or a logical network, such as using a specific Virtual Local Area Network (VLAN) sharing the same physical network of FCoE SAN.

In the outband approach, FCM 401 may exchange information (e.g. fabric services) between FDFs 410 controlled by FCM 401 in a process similar to the inband approach, with the exception that the information may be conveyed using IP/Ethernet packets. The top half of FIG. 4 illustrates an FDF 410 that comprises a FIP proxy 415 that may be used to handle FLOGI and LOGO. When FDF 410 receives a FIP FLOGI request from an ENode 450, FDF 410 may terminate the request and send a new N_Port_ID allocation request using UDP to FCM Y 401. On receipt of N_Port_ID allocation reply in a UDP frame, FDF 410 sends FIP FLOGI LS_ACC frame to the ENode 450. In the bottom half of FIG. 4, FDF E 410 comprises a fabric service proxy 417, which handles fabric service requests. Fabric service requests may be sent using UDP frame over the IP/Ethernet network 425. Once FCM 401 receives the fabric service request, FCM 401 will send a fabric service reply back to FDF 410 as a UDP packet. The fabric service request is then forwarded from FDF 410 to ENode 450. While FIG. 4 illustrates the use of UDP packets to communicate with FCM 401 and FDF 410, other Open Systems Interconnection (OSI) layer 213 protocols may be used.

The outbound approach is also capable of FDF_ID assignment, topology discovery, and FDF forwarding table distribution to be done via the IP/Ethernet based management network 425. For example, FCM Y 401 may request FDF 410 to send the adjacency information to FCM Y 401. After computing the base forwarding table for an FDF 410, FCM 401 may also send the forwarding table information to FDF 410 using UDP. Again, the outband approaches may differ from the inband approach through the method by which information is exchanged between a FCM 401 and FDF 410. The outband approach may use IP/Ethernet protocols (e.g. UDP) while the inband approach may use FC protocols with FCoE encapsulation (e.g. SW_ILS). A more detailed discussion for FDF_ID assignment, topology discovery, and FDF forwarding table distribution will be discussed later.

A third embodiment for FCMs and FDFs to communicate may be through a hybrid approach. In a hybrid approach, some communications are outband (e.g., topology discovery and FDF forwarding table), while some are inband (e.g., FLOGI/LOGO and fabric services). Information exchanges in the hybrid approach may operate similar to inband and outband approaches, with the exception of managing different encapsulation. The hybrid approach may also have an FCM use VA_Ports to communicate with their adjacent FDFs and VE_ports to communicate with other FCMs, such as in a virtual domain environment. Conversely, FCMs may use the IP/Ethernet based management network 425 illustrated in FIG. 4 to replace VE_Ports used to communicate between the FCMs. In such a case, FCMs may connect via regular IP/Ethernet when an FCoE network uses the outband approach. For example, in FIG. 4, FCM Y 401 and FCM X 401 may exchange Switch_Name information via UDP. Specifically, FCM Y 401 may send to FCM X 401 a request that is encapsulated in a UDP packet to configure FCM X 401. FCM X 401 may then send to FCM Y 401 a reply message using a UDP encapsulated packet. The use of IP/Ethernet communications between FCM Y 401 and FCM X 401 may be implemented independent of the approach used to communicate between FCM 401 and FDFs 410.

Figure 5:
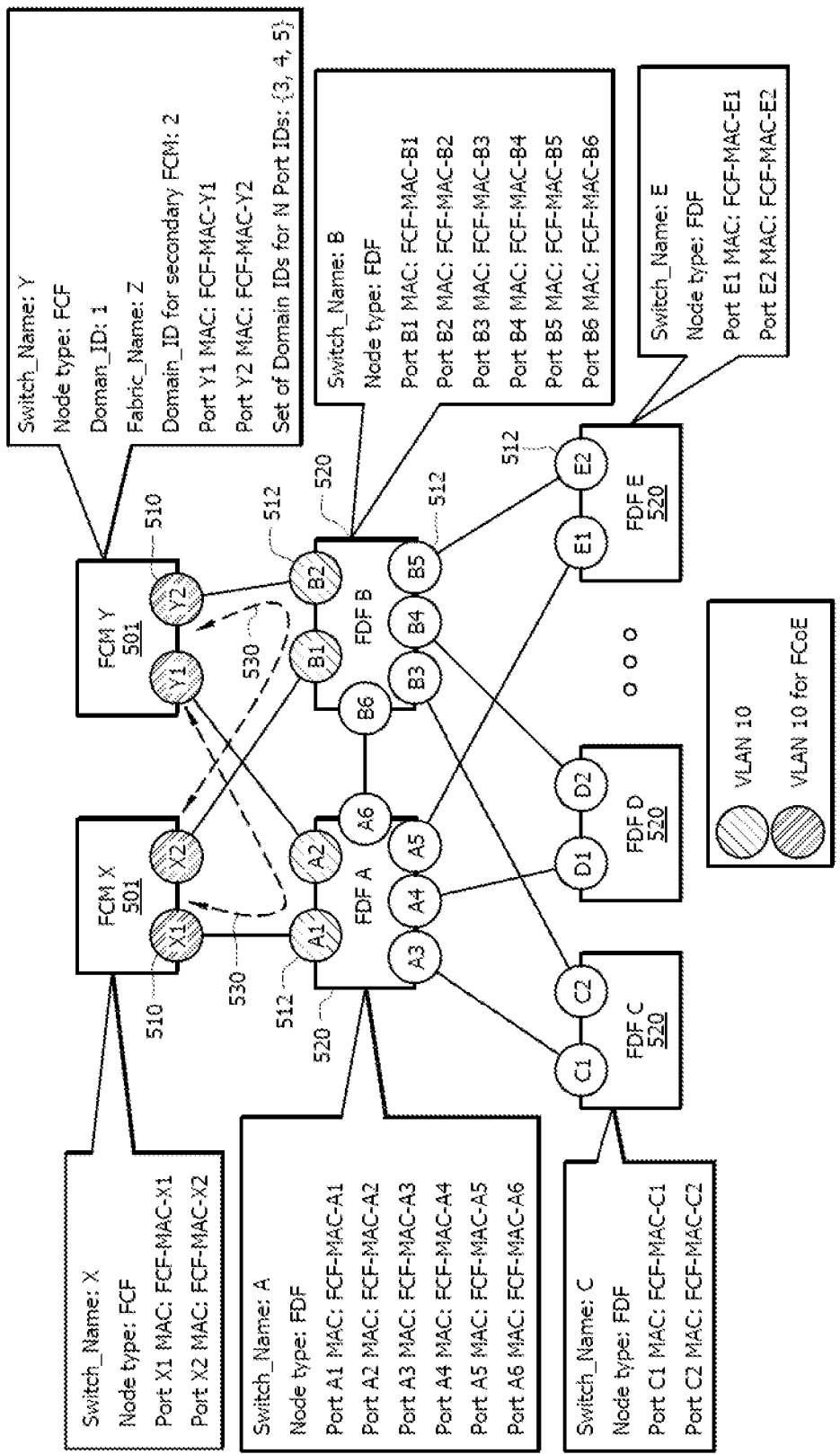
FIG. 5 is a schematic diagram of a framework of another embodiment of an FCoE network with a centralized control and management system.

FIG. 5 illustrates a framework of another embodiment of an FCoE network with a centralized control and management system. FCM Y 501 may be configured with an 8-byte Switch_Name (e.g. World Wide Name (WWN)), an 8-bit Domain_ID, and a FCF node type. FCM X 501 may be configured similarly to FCM Y 501, but without the Domain_ID. A primary FCM may be chosen based on which FCM has a higher Switch_Name. In FIG. 5, FCM Y 501 has a Switch_Name of Y, which is higher than the Switch Name X for FCM X 501, and thus FCM Y 501 is designated as the primary FCM. As a primary FCM, FCM Y 300 may also be configured with a Fabric_Name, a set of Domain_IDs from which N_Port_IDs can be allocated, and a Domain_ID for the secondary FCM. When FCM Y 501 fails, FCM X 501 may be configured to become the primary FCM. Each FCM 501 comprises a plurality of FCM ports 510. Each FCM port may be assigned a Media Access Control (MAC) address (e.g. FCF-MAC-Y1, FCF-MAC-Y2, etc.). FIG. 5 illustrates that FCM Y 501 has two FCM ports 510, Y1 and Y2; however, an FCM 501 may have any number of ports.

Each FDF 520 may comprise a plurality of FDF ports 512. Similar to the FCM ports, each FDF port may be assigned a MAC address (e.g. FCF-MAC-A1, FCF-MAC-A2, etc.). FDFs 520 are also each assigned a Switch_Name and a node type. As shown in FIG. 5, FDF A 520 has been configured to have a Switch_Name of A and with a FDF node type (as opposed to an FCF node type). The Switch_Name for FDFs 520 may be used to determine the uplink ports used to communicate with the primary FCM 501. The FDF port MAC addresses may be used to route pathways in forwarding tables. Uplink ports and forwarding table will be discussed in more depth below.

FIG. 5 illustrates that an FCoE network may be configured so that a VLAN (e.g. VLAN 10) may be enabled for FCoE services on the FCM ports 510, while the relevant FDF ports 512 may be enabled to handle regular Ethernet connectivity. Through a completion of the FIP Exchange Link Parameters (ELP) exchange 530, two VE_Ports to VE_Ports virtual links may be established between the FCM Y 501 and FCM X 501 using the VLAN configuration. FIG. 5 also illustrates two VE_Port to VE_Port virtual links: one from FCM port X1 510 (FCF-MAC-X1) via FDF port A1 512 (FCF-MAC-A1) and FDF port A2 512 (FCF-MAC-A2) to FCM port Y1 510 (FCF-MAC-Y1), and a another one from FCM port X2 510 (FCF-MAC-X2) via FDF port B1 512 (FCF-MAC-B1) and FDF port B2 512 (FCF-MAC-B2) to FCM port Y2 510 (FCF-MAC-Y2). FIG. 5 may be further configured with a second VLAN (e.g. VLAN 20), where all FCoE ports of FCMs 501 and FDFs 520 provide FCoE services.

Figure 6:
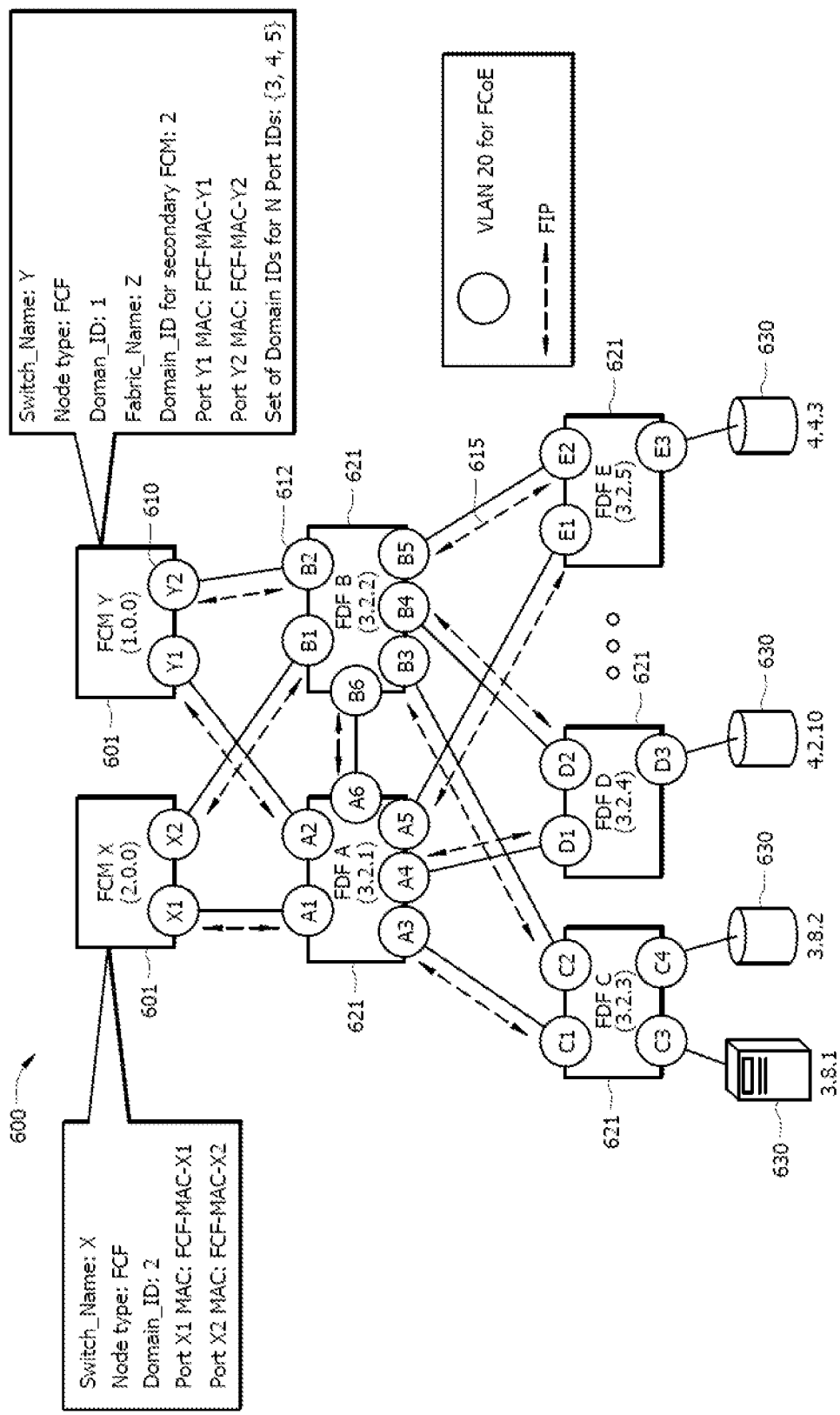
FIG. 6 is a schematic diagram of an embodiment of an FCoE network establishing virtual links, FDF_IDs, and N_Port_IDs.

FIG. 6 illustrates another embodiment of an FCoE network 600 establishing virtual links throughout the network. The second VLAN (e.g. VLAN 20) may allow VA_Port to VA_Port virtual links to be instantiated between an FCM port 610 and an FDF port 612 (e.g., between port X1 and port A1) after the successful completion of a FIP ELP exchange 615. FIP ELP exchanges 615 may occur between two FDF ports 612 (e.g., between port A3 and port C1) and may be used to instantiate VA_Port to VA_Port virtual links between the two FDF ports. Eventually, all FDFs may have VA_Port to VA_Port virtual links instantiated on the FDF ports 612.

An alternative for using separate VLAN for communication between FCMs is to use a lossless Ethernet LAN as shown in FIG. 2. FIG. 2 may be configured so that only one VLAN supports FCoE services. A full mesh of VA_Port to VA_port virtual links may be instantiated among FCMs and FDFs as FCMs and FDFs are connected to the same lossless Ethernet. FCM X 201 may have a plurality of VE_Ports, each of which has a VE_Port to VE_Port virtual link to FCM Y 200.

After instantiating the two VE_port to VE_port links, the primary FCM may assign the Domain_ID to the secondary FCM. Moreover, the primary FCM may send the set of Domain_ID information for the N_Port_ID allocation to the secondary FCM. Using FIG. 5 as an example, FCM Y 501 may assign the Domain_ID 2 to FCM X 501 and send the set of Domain_ID for the N_Port_ID (3, 4, 5) using the Domain_ID Set Announcement (DSA) SW_ILS frame (see FIG. 7). SW_ILS frames may be sent as FCoE frames with the fabric control N_Port_ID (FFFFFDh) used as the S_ID and D_ID. After receiving the DSA SW_ILS frame, FCM 501 may reply with DSA SW_ACC frame.

FIG. 7 is a table describing the elements and size an embodiment of DSA SW_ILS frame 735. The DSA SW_ILS frame 735 begins with a SW_ILS code 740, which may be about two bytes long. The SW_ILS code 740 may define which SW_ILS command is sent. The SW_ILS code 740 may be followed by a Payload length 742 that may be about two bytes long. The Payload length 742 may be used to indicate the size of the payload for the DSA SW_ILS frame 735. The Primary FCM Switch_Name 744 and Primary FCM Domain_ID 746 may specify the name and Domain_ID of the FCM that is assigning the Domain_ID to the secondary FCM. The Primary FCM Switch_Name 744 and Primary FCM Domain ID 746 may be about eight bytes and one byte, respectively. The Reserved elements 750 are about three bytes long and are reserved for other purposes. The Secondary FCM Switch_Name 748 may specify the name of the secondary FCM receiving the DSA SW_ILS frame 735 and may be about eight bytes long. The Secondary FCM Domain_ID 752 may specify the Domain_ID assigned to the secondary FCM, and may be about one byte long. The Fabric_Name 754 may specify the fabric name assigned to the primary FCM and may be about eight bytes long. For example, in FIG. 5 the Fabric_Name for FCM Y 501 is Z. The Fabric_Name of FCM Y 501 may also be set to the Switch_Name. The number of Domain_IDs (n) 756 may specify the number of Domain_IDs sent in the DSA SWA_ILS frame 735 and may be about four bytes. The DSA SW_ILS frame 735 may contain a plurality of Domain_ID entries 758. The Domain_ID may be about four bytes and may have the most three significant bytes of each Domain_ID entry 758 reserved. The DSA SW_ACC frame is similar to DSA SW_ILS frame 735 except that SW_ILS code 740 may be 0200h.

After establishing VA_Port to VA_Port virtual links through the FCoE Network, the primary FCM may begin assigning FDF_IDs to its adjacent FDFs or FDFs with a hop count of zero. Hop count may refer to the number of intermediate FDFs that data must pass through between the primary FCM and the destination FDF. Adjacent FDFs or FDFs that have a VA_Port to VA_Port virtual link connection to the primary FCM may have a hop count of zero. Once all adjacent FDFs have obtained an FDF_ID, the FCM assigns FDF_IDs to all FDFs with a hop count of one. FDFs that have VA_Port to VA_Port virtual links to the adjacent FDFs may have a hop count of one. For example, in FIG. 6, FDF A 621 would have a hop count of zero, while FDF C 621, would have a hop count of one. Thereafter, the FCM assigns FDF_IDs to all the FDFs with a hop count of two, and so on (i.e. multi-hop approach) until all FDFs in the FCoE Network has been assigned a FDF_ID. Note that the process may prioritize assigning FDF_IDs to FDFs with lower hop counts. For example, an FDF with hop count of zero may receive an FDF_ID prior to an FDF with a hop count of one or two.

Figure 8:
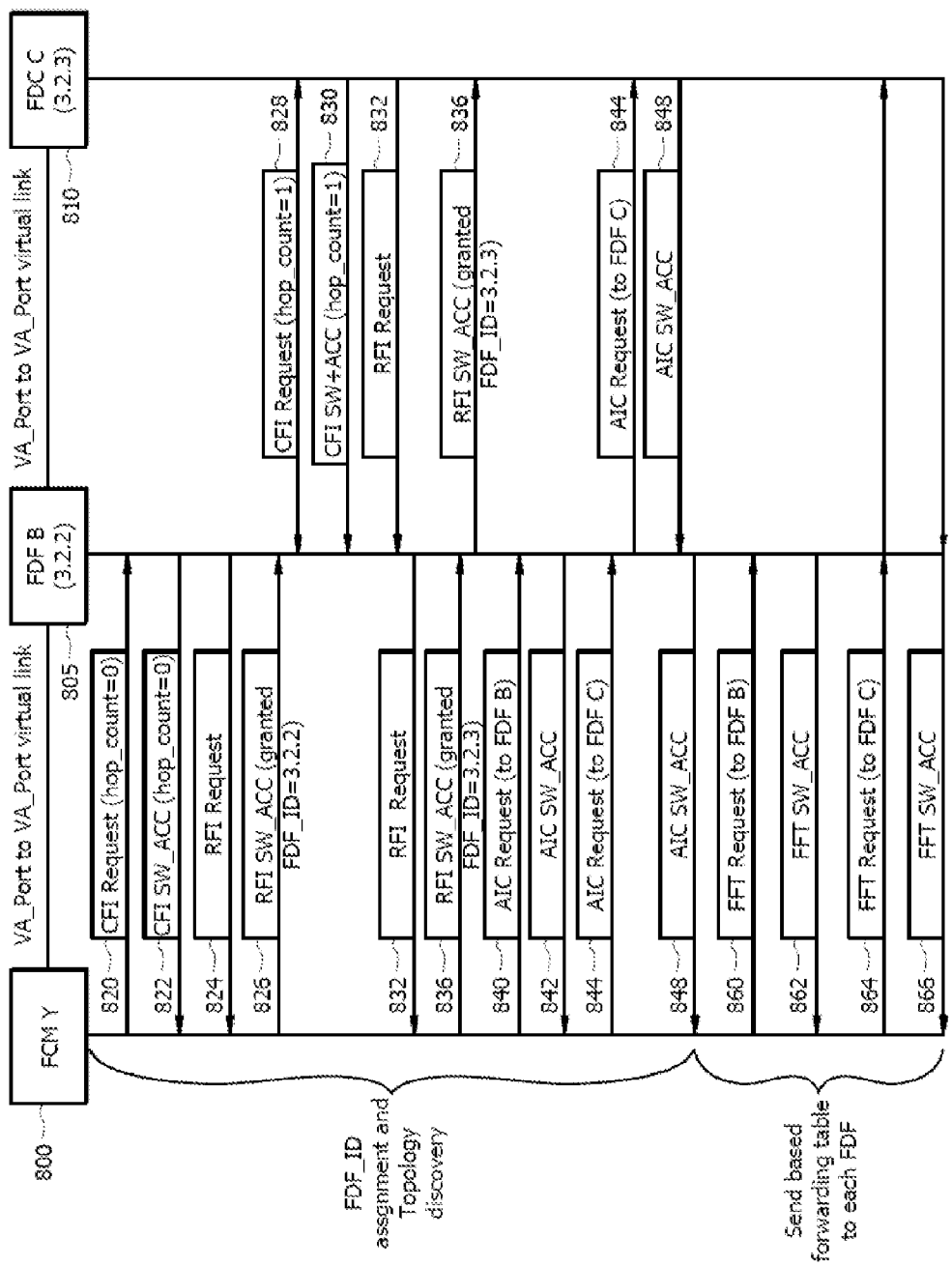
FIG. 8 is a protocol diagram of an embodiment of a message exchange process for obtaining the topology of the FCoE system.

FIG. 8 is a protocol diagram of an embodiment of a message exchange process for obtaining the topology of the FCoE system. In FIG. 8, FCM 800 may be designated as the primary FCM. To assign FDF_IDs to FDFs 805, 810, FCM 800 first sends out a CFI request 820 (see FIG. 9) to its adjacent FDF 805. The CFI request 820 may contain information about the controlling FCM 800 and may specify a hop count of zero (e.g. to indicate that the CFI request 820 is directly from the FCM 800). On receipt of a CFI request 820 from FCM 800, FDF B 805 replies with CFI SW_ACC frame 822 (see FIG. 10) that confirm the information about the primary and secondary FCMs 800. Based on the CFI request 820 from FCM 800, FDF 805 may send a RFI request 824 (see FIG. 11) back to FCM 800. Multiple FCMs 800 may send out CFI requests 820 to adjacent FDFs 805, but adjacent FDFs 805 may only send out RFI requests 824 to the primary FCM 800. After the FCM 800 receives the RFI request 824, FCM 800 will send an RFI SW_ACC frame 826 to FDF 805 specifying the FDF_ID. The FDF_ID assigned to FDF 805 may be obtained from a pool of N_Port_IDs and assigned by FCM 800 using the RFI SW_ACC frame 826. For example, FDF B 805 may be assigned the three byte FDF_ID of 3.2.2 after receiving the RFI SW_ACC frame 826. The primary FCM 800 may assign other FDF_ID (e.g., 3.2.1) to other adjacent FDFs 805 using the CFI/RFI requests.

After FDF 805 obtains its FDF_ID, FDF 805 may send out a CFI request 828 with hop count incremented by one to FDF 810. The hop count of one may indicate the distance between the FCM 800 and FDF 810. On receipt of CFI request 828 from FDF 805, FDF 810 replies with CFI SW_ACC frame 830, which may contain information similar to CFI SW_ACC frame 822, but in regards to FDF 810. FDF C 810 may subsequently send RFI request 832 to FCM 800 via FDF 805. RFI requests 832 may contain information similar to RFI request 824, but regarding to FDF 810. When RFI request 832 reaches FDF 805, FDF 805 forwards the RFI request 832 to FCM 800. FCM 800 may then send a RFI SW_ACC frame 836 to FDF 805, which FDF 805 will forward the RFI SW_ACC frame 836 to FDF 810. RFI SW_ACC frame 836 may contain information similar to RFI SW_ACC frame 826, but regarding FDF 810. As shown in FIG. 8, FDF 810 may be assigned N_Port_ID 3.2.3. Assigning FDF_IDs using the multi-hop approach may be done for a plurality of FDFs that may have hop counts larger than one.

Similar to assigning FDF_IDs, FCM 800 may send AIC requests to adjacent FDFs, then to FDFs one hop away, and then to FDFs two hops away and so on, until the topology of the FCoE network is obtained. Specifically, after assigning FDF_IDs to FDFs 805 and 810, FCM 800 sends an AIC request 840 (see FIG. 13) to its adjacent FDF 805, requesting for adjacency information from FDF 805. Once FDF 805 receives the request, FDF 805 may reply with AIC SW_ACC frame 842 (see FIG. 14), which may specify the adjacency information for FDF 805. FDF 810 may be included as one of the FDFs specified in the adjacency information sent to FCM 800. Using the adjacency information obtained from FDF 805, FCM 800 gathers adjacency information from the next FDF 810. Specifically, FCM 800 may send an AIC request 844 to FDF 810 via FDF 805, which forwards the AIC request 844 to FDF 810. The AIC request 844 may contain information similar to AIC request 840, but regarding FDF 810. Upon receipt of the AIC request 844, FDF 810 may send an AIC SW_ACC frame 848 back to FDF 805, which forwards the AIC SW_ACC frame 848 to FCM 800. AIC SW_ACC frame 848 may contain information similar to AIC SW_ACC frame 842, but regarding FDF 810. Obtaining FDF adjacency information using the multi-hop approach may be done for a plurality of FDFs that may have hop counts larger than one. Assigning FDF_IDs and obtaining FCoE topology process may also be used in a virtual domain when FCMs are replaced by FCFs.

The bottom portion of FIG. 8 illustrates the message exchange protocol for sending base forwarding tables from an FCM 800 to controlled FDFs 805, 810. FFT request 860 carries information necessary for FDFs 805, 810 to build a base forwarding table (e.g., use output port MAC to get the output port ID). After calculating the base forwarding table for each FDF 805, 810, FCM 800 may send the base forwarding table to its adjacent FDF 805, with hop count of zero, via a FFT request 860 (see FIG. 19). When FDF 805 receives the FFT request 860, FDF 805 may then respond by sending FFT SW_ACC frame 862. The FFT SW_ACC frame 862 notifies FCM 800 that FDF 805 accepted the frame. FCM 800 may continue sending FFT requests to all adjacent FDFs 805. Afterwards, FCM 800 may send FFT request 864 to FDFs one hop away (e.g. FDF 810) using FDF 805 to forward the request. FFT request 864 may contain information similar to FFT request 860, but pertaining to FDF 810. After receiving the FFT request 864, FDF 810 may send back an FFT SW_ACC frame 866 to FCM 800 via FDF 805. The FFT SW_ACC frame 866 may contain information similar to FFT SW_ACC frame 862 but pertaining to FDF 810. Once FDFs 810 that are one hop away receive their base forwarding tables, FCM 800 will send FFT requests to FDFs two hops away, three hops away, and so on using the multi-hop approach until all FDFs in the FCoE network receives their base forwarding tables.

FIG. 9 is a table describing the elements and size of an embodiment of a CFI request 952. The CFI request 952 may comprise an SW_ILS code 960, Primary FCM Switch_Name 966, Primary FCM Domain_ID 970, Secondary FCM Switch_Name 972, Secondary FCM Domain_ID 974, Fabric_Name 976, and Reserved elements 968, all of which may be similar to the corresponding parts of DSA SW_ILS frame 735 described in FIG. 7. The CFI request 952 may also contain a Flag element 962 that may be about two bytes long and may be used as a sixteen-bit identifier. For example, the Flag element's 962 zero bit (Bit 0 in FIG. 9) may be set when FCM is announcing itself, while the Flag element's 962 first bit (Bit 1 in FIG. 9) may be set when the primary FCM is not reachable (e.g. the primary FCM may have failed). The Flag element's 962 second bit (Bit 2 in FIG. 9) may be set when the secondary FCM notifies all FDFs that the primary FCM has failed and the secondary FCM will become the new primary FCM. Flag element's 962 third through fifteen bits may be reserved for other purposes. The CFI request 952 may have an additional element for Originating Switch_Name 964, which may be about eight bytes and may specify the Switch_Name of the FDF or FCM sending the CFI request 952. Lastly, the CFI request 952 may comprise a Hop Count element 978 that is about one byte and may specify the hop count number for the FDF receiving the CFI request 952.

FIG. 10 is a table describing the elements and size of an embodiment of a CFI SW_ACC frame 1054. The CFI_SW_ACC 1054 may comprise a SW_ILS code 1060, a Flag element 1062, Primary FCM Switch_Name 1066, Reserved element 1068, Primary FCM Domain_ID 1070, Secondary FCM Switch_Name 1072, Secondary FCM_Domain ID 1074, Fabric_Name 1076, and Hop Count element 1078, all of which are similar to the CFI request 952, except that the SW_ILS code 1060 may be set to 0200h. Setting the SW_ILS code to 0200h enables the FCM and FDF to distinguish the frame as a CFI SW_ACC frame 1054. The CFI_SW_ACC frame may also comprise a Responding Switch_Name 1064, which may be about eight bytes long and may specify the name of the FDF that is sending the AIC SW_ACC frame 1054.

FIG. 11 is a table describing the elements and size of an embodiment of a RFI request 1156. The RFI request 1156 may comprise a SW_ILS code 1160, the Requesting Switch_Name 1162 and the Primary FCM Switch_Name 1164. The SW_ILS code 1160 and Primary FCM Switch_Name 1164 are similar to the corresponding components of the DSA_SW_ILS frame (see FIG. 7), with the exception that the SW_ILS_code 1160 may be about four bytes long. The Requesting Switch_Name 1162 may be about eight bytes long and may specify the name of the FDF that is sending the RFI request 1156.

FIG. 12 is a table describing the elements and size of an embodiment of the RFI SW_ACC frame 1258. The RFI SW_ACC frame 1258 comprises a SW_ILS code 1260, the primary FCM Switch_Name 1262, and Reserved element 1266, all of which that correspond to the components of CFI SW_ACC frame 1054 (see FIG. 10), except that the Reserved element 1266 may be about one byte long and the SW_ILS code may be about four bytes long. As a result, the SW_ILS code 1260 is set to 02000000h to indicate that the frame is a SW_ACC frame. The RFI SW_ACC frame 1258 may further comprise a Recipient FDF Switch_Name 1264 and Granted FDF_ID 1268. The Recipient FDF Switch_Name 1264 may be eight bytes long and may specify the FDF that will receive the RFI SW_ACC frame 1258, and thus receive the FDF_ID. The Granted FDF_ID 1268 may be three bytes long and may specify the FDF_ID that will be assigned to the recipient FDF.

FIG. 13 is a table describing the elements and size of an embodiment of an AIC request 1360. The AIC request 1360 comprises a SW_ILS code 1362 and the Primary FCM Switch_Name 1364, all of which corresponds the components of the RFI SW_ACC frame 1258 (see FIG. 12), except the SW_ILS code 1362 is not set to 02000000h. The Recipient FDF Switch_Name 1366 may be about eight bytes long and may specify the name of the FDF from which the FCM is attempting to obtain adjacency information.

FIG. 14 is a table describing the elements and size of an embodiment of the AIC SW_ACC frame 1462. The AIC SW_ACC frame 1462 may comprise a SW_ILS code 1466, Link descriptor length 1468, Payload length 1470, Responding FDF Switch_Name 1472, Primary FCM Switch_Name 1474, reserved element 1476, Number of links 1478, and a plurality of link descriptors 1464. The SW_ILS code may be about one byte long and may be coded as 02h to signify the frame is a SW_ACC frame. The Link descriptor length 1468 may be about one byte and may specify the length of the descriptors for link descriptor #1 to link #L. The payload length 1470 may be about two bytes and may specify the AIC SW_ACC frame's 1462 length. The Responding FDF Switch_Name 1472 may be about eight bytes long and may specify the name of the FDF that is sending the AIC SW_ACC frame 1462. The primary FCM Switch_Name 1474 and Reserved element 1476 correspond to the component of the DSA SW_ILS frame 735 (see FIG. 7). The number of links 1478 may specify the number of FDFs that are adjacent or directly linked to the responding FDF and maybe about two bytes.

The Link descriptor 1464 may provide the MAC addresses of the ports used to link the two FDFs. As such, the Link descriptor 1464 comprises a Remote FDF/FCM Switch_Name 1482, Local port FCF-MAC 1484, the Remote port FCF-MAC 1486, reserved element 1488, and the Cost element 1490. The Remote FDF/FCM Switch_Name 1482 may specify the name for the adjacent FDF or FCM and may be about eight bytes long. The Local port FCF-MAC 1484 may specify the MAC address for the responding FDF's port and may be about two bytes long. The remote port FCF-MAC 1486 may specify the MAC address for the adjacent FDF and may be about eight bytes. The Cost element 1490 may specify a value that describes designates the number of virtual links an FCoE frame will travel from a source to a destination and may be about two bytes. Using FIG. 6 as an example, forwarding an FCoE frame from FDF port A6 612 to FDF port B6 612 will have a cost of one. However, an FCoE frame that travels from FDF port A6 612 to reach FDF port C2 612 would have a cost of two.

A primary FCM may send the adjacency information received in a subsequent AIC SW_ACC frame to a secondary FCM in a new SW_ILS or it may send the whole topology information to the backup FCM using Topology (TOPO) SW_ILS. A TOPO SW_ILS may comprise a SW_ILS code, Link descriptor length, Payload length, Primary Switch_Name, Secondary Switch_Name, and a Reserved element, which correspond to the components found in the AIC SW_ACC frame 1462 (see FIG. 14) and CFI request 952 (see FIG. 9). The TOPO SW_ILS frame may further comprise a number of FDF entries (k) and a plurality of FDF entries (k). The number of FDF entries may specify the number of FDF entries that are in the frame and may be about two bytes long. The FDF entries may comprise a FDF Switch_Name, Number of links, and Links descriptors, all of which may correspond to components of the AIC SW_ACC frame 1462 (see FIG. 14).

Figure 15:
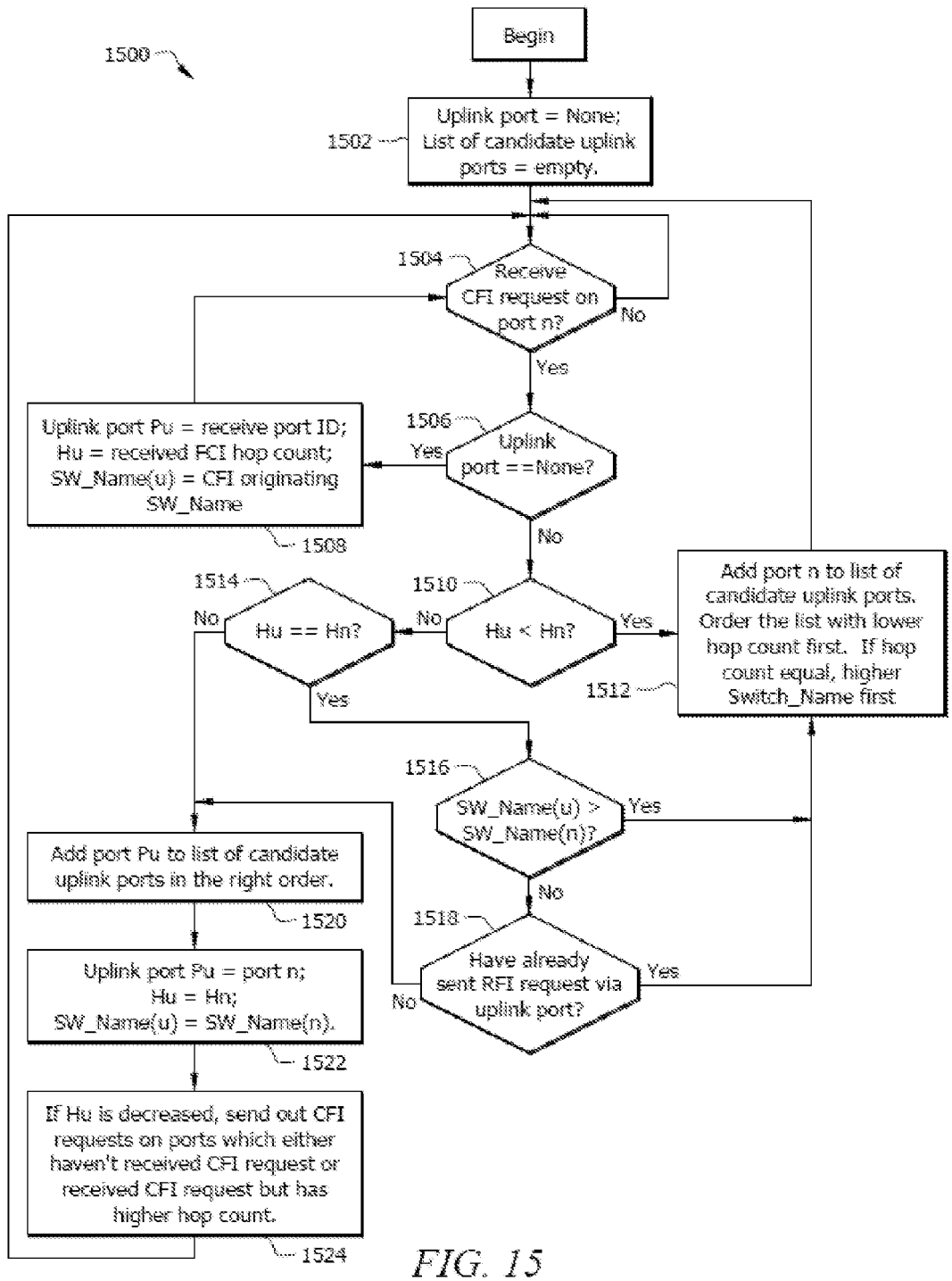
FIG. 15 is a flowchart of an embodiment of a process of establishing uplink communication.

FIG. 15 is a flowchart of an embodiment of a process 1500 of establishing uplink communication for FDF ports, which may be implemented by a FDF. Generally, after an FDF obtains an FDF_ID, the FDF sends out a CFI request incremented by one to an adjacent FDF port that have not received a CFI request or received CFI request but with higher hop count. The adjacent FDF comprise a plurality of ports that may receive CFI requests from a plurality of FDFs. The adjacent FDF may choose a port which receives a CFI request with lower hop count or higher Switch_Name if the hop count is equal to its uplink port to the primary FCM. Each of the blocks of the process of establishing uplink communication for FDF ports 1500 is discussed in detail below.

The process 1500 of establishing uplink communication to the primary FCM begins at 1502 where an FDF has not yet established any uplink ports and the list of candidate uplink port is empty. At block 1504, the FDF may determine whether it has received a CFI request at one of the ports. If no CFI requests have been received, then FDF waits until a CFI request is received. If a CFI request is received on a port (e.g. port n), then the uplink communication to the primary FCM proceeds to block 1506. Here, the FDF determines whether any uplink ports have been already established. If no prior uplink port has been established, then the port ID, hop count, and the switch name for the FDF or FCM that sent the CFI request may be stored as the uplink port to reach an FCM at block 1508, and the process 1500 returns to block 1504. However, if the FDF has already received other CFI request on other ports at block 1506, then the process of establishing uplink communication for FDF ports 1500 proceeds to block 1510.

At block 1510, the FDF compares the hop count from the port (e.g. port n) that received the CFI request to the current uplink port. If the hop count (Hn) that was received on the port (e.g. port n) is greater than the current hop count (Hu), then the port is added to the list of candidate uplink ports at block 1512, where the list is ordered with the lower hop count first. The process 1500 then returns to block 1504. If Hu is greater than Hn at block 1510, then the process proceed to block 1514. At block 1514, the FDF determines whether the hop counts for both ports are equal. If they are equal, then the process 1500 proceeds to block 1516. If the hop count for the port that received the CFI request (e.g. port n) is not equal to the current hop count, then the process proceeds to block 1520, where the current uplink port is added in order to the list of candidate uplink ports and then proceeds to block 1522. At block 1522 the following are set: port n is set as the current uplink port to reach the primary FCM; the hop count for port n is now set as the current uplink hop count; and the Switch_Name for port n is now set to the current uplink Switch_Name. Thereafter, the process 1500 advances to block 1524, where if current hop count decreases, then the FDF may send out CFI requests using ports that have not received CFI requests or received CFI request but has higher hop counts (e.g. downlink ports). Regardless of whether the hop count decrease or not, the process returns to block 1504.

Returning back to block 1516, the FDF determines which port has the higher Switch_Name. If the current uplink port has a higher switch name, then the process 1500 proceeds to block 1512. Otherwise, the process 1500 proceeds to block 1518, where the FDF determines whether a RFI request has been sent by the current uplink port. If an RFI request has been sent, then the process 1500 proceeds to block 1512. If no RFI request has been sent, then the process 1500 proceeds to 1520.

During the process of establishing uplink communication for FDF ports 1500, FDFs may know the uplink port to the primary FCM and the downlink ports to reach downstream FDFs. An FDF's uplink port may change after it sends out a RFI request on behalf of an FDF downstream. When an uplink fails, an FDF may choose the first port from the list of candidate ports which has lowest hop count or highest Switch_Name if hop count is equal as its new uplink port.

In an FCoE network, the primary FCM may fail causing the secondary FCM to become the primary FCM. Using FIG. 5 as an example, FCM X 501 may decide the primary FCM Y 501 may have failed when FCM X 501 lost connectivity with FCM Y 501 (e.g., FIP keep-alive (FKA) frames are not received for more than three FKA advertisement period (FKA_ADV_PERIOD) intervals) or FCM X 501 may receive a CFI request (with bit 1 set) from at least one FDF 520 that is adjacent to FCM Y 501 (e.g. FDF A and FDF B) that FCM Y 501 is not reachable. FDF A 520, which is adjacent to FCM Y 501, may decide that FCM Y 501 is not reachable based on lost connectivity with FCM Y 501 (e.g., FIP keep-alive frames are not received for more than three FKA_ADV_PERIOD intervals) or FDF A 520 no longer receives periodic FFT request to update its base forwarding table.

FCM X 501 may become the primary FCM by sending out CFI requests, with the flooding bit set, to all of the FDFs 520 adjacent to FCM X 501. For example, when adjacent FDF A 520 receives the CFI request from FCM X 501, FDF A 520 treats FCM X 501 as the primary FCM. The secondary FCM specified in the CFI request may not be FCM Y 501 and may be some other FCM 501. FDF A 520 may then send the CFI SW_ACC frame back to the FCM X 501. FDF A 520 may also send the CFI request to other FCoE ports that have not received the CFI request from FCM X 501. CFI requests may be sent to every FDF 520 in the FCoE network. Afterwards, each FDF 520 will communicate with FCM X 501 for normal operations.

Recall that FIG. 6 is a schematic diagram of an embodiment of an FCoE network 600 establishing virtual links, FDF_IDs, and N_Port_IDs. FCMs 601, FDFs 621, and ENodes 630 have been assigned identifiers (IDs). Using FIG. 6 as an example, FCMs 601 have been assigned FCM_IDs of 1.0.0 and 2.0.0, while FDFs A, B, C, D, E 621 have been assigned FDF_IDs of 3.2.1, 3.2.2, 3.2.3, 3.2.4, and 3.2.5, respectively. The four ENodes 630 have been assigned N_Port_IDs of 3.8.1, 3.8.2, 4.2.10, and 4.4.3 to their N_Ports or VN_Ports.

FCM_IDs may be assigned using two methods. The first method may be to use Domain_IDs. As discussed before, a primary FCM may be initially configured with its own Domain_ID and a second Domain_ID for the secondary or backup FCM. Using the DSA SW_ILS frame and DSA SW_ACC frame, the primary FCM assigns the Domain_ID to the secondary FCM. Hence, in FIG. 6 FCM Y 601 has an FCM_ID of 1.0.0 because the FCM has a Domain_ID of 1 and FCM X 601 has an FCM_ID of 2.0.0 because the FCM X 601 has a Domain_ID of 2. Another method of assigning FCM_IDs may be to use FFFFh followed by the Domain_ID. FCM Y 601 may have a FCM_ID of FFFF01h based on FIG. 6. Either methods of obtaining Domain_IDs may be used as long as the method used is consistent across the FCoE network.

ENodes may acquire or allocate their N_Port_ID on their N_Ports and VN_Ports using FIP FLOGI that was previously discussed. To acquire or allocate an N_Port_ID, an ENode sends a FIP FLOGI request to an edge FDF, which forwards the request through the FCoE network using an N_Port_ID allocation request to the primary FCM. The primary FCM replies with an N_Port_ID allocation reply and sends the N_Port_ID allocation reply through the FCoE network, back to the edge FDF. The edge FDF will forward the N_Port_ID information to the ENode using the FIP FLOGI LS_ACC frame. Afterwards, the ENode has been allocated an N_Port_ID and is now connected to the FCoE network through the edge FDF.

ENodes may de-allocate their N_Port_ID using the FIP LOGO Request. To de-allocate an N_Port_ID the ENode sends a FIP LOGO request to an edge FDF, which forwards the request through the FCoE network using an N_Port_ID Deallocation request to the primary FCM. The primary FCM replies with an N_Port_ID Deallocation SW_ACC frame and sends the frame back to the edge FDF through the FCoE network. The N_Port_ID Deallocation SW_ACC frame comprises a default SW_ACC frame. The edge FDF then forwards the de-allocation information to the ENode using the FIP LOGO LS_ACC frame. Once the ENode receives the frame, the N_Port or VN_Port terminates its connection with the edge FDF.

For the edge FDF, FCoE ports that face an ENode may be configured with only one FCoE VLAN, and thus may enable the edge FDF to handle FIP VLAN requests and FIP discovery solicitation requests locally. An FIP discovery solicitation request may be sent to the edge FDF from the ENode, and the edge FDF may reply with an FIP discovery advertisement frame. However, if some of the FCoE ports are configured with more than one FCoE VLAN and the FDF does not know which FCoE VLAN to use for a given ENode MAC, it may need to consult with the primary FCM. To determine which FCoE VLAN to use, the ENode sends a FIP VLAN request to the edge FDF. The edge FDF then forwards the request as a VLAN SW_ILS frame to the primary FCM. Once the primary FCM receives the VLAN_SW_ILS frame, the FCM determines the proper VLAN and sends the information to the edge FDF using a VLAN SW_ACC frame. Afterwards, the edge FDF may forward the information received from the primary FCM using an FIP VLAN Notification to the ENode. The ENode may then proceed with FIP discovery solicitation requests and FIP FLOGI requests.

The VLAN SW_ILS frame may comprise a SW_ILS code, Requesting FDF Switch_Name, Primary FCM Switch_Name, F_Port Name, a Flag element, ENode MAC, and ENode_Name element. The SW_ILS code is about four bytes long and may specify a command code similar to FIG. 14. The requesting FDF Switch_Name may specify the Switch_Name for the edge FDF that is sending the VLAN SW_ILS frame and may be about eight bytes in size. The Primary FCM Switch_Name may reference the FCM that the request will be sent to and is about eight bytes long. The F_Port name may reference the port on the edge FDF that is linked to the ENode and may be about eight bytes in length. The Flag element is about two bytes long and may be set to one when the ENode_Name element exists. The ENode MAC may specify the ENode MAC address that has sent the FIP VLAN request and may be about six bytes long. The ENode_Name may specify the name assigned to the ENode and may be about eight bytes long. An ENode may send a FIP discovery solicitation request instead of FIP VLAN request to an FCoE port of a FDF that is configured with more than one FCoE VLANs. In this case, the FDF may still use the VLAN SW_ILS with the ENode_Name Flag bit set to 1 to determine which VLAN to use.

The VLAN SW_ACC frame may comprise a SW_ILS code, Primary FCM Switch_Name, Recipient FDF Switch_Name, Reserved element, and VLAN ID. The SW_ILS code, Primary FCM Switch_Name and Reserved elements in the VLAN SW_ACC frame may be similar to corresponding components discussed for the RFI SW_ACC frame (see FIG. 12) with the exception that the SW_ILS code may not bet set to 02000000h and the reserved element may be about two bytes long. The Recipient FDF Switch_Name may be about eight bytes long and may specify the edge FDF that will received the VLAN SW_ACC frame. The VLAN ID may specify which FCoE VLAN should be used to connect to the ENode MAC and may be about two bytes long.

The N_Port_ID allocation request may comprise a SW_ILS code, Requesting FDF Switch_Name, Primary FCM Switch_Name, F_Port Name, and FLOGI/Fabric Discovery (FDISC) parameters. The SW_ILS code, Requesting FDF Switch_Name, Primary FCM Switch_Name, and F_Port Name may be similar to corresponding parameters found in the VLAN SW_ISL frame except that the F_Port Name may be only two bytes. The FLOGI/FDISC parameters may be about 116 bytes and may specify the parameters the ENode sent to the edge FDF when attempting to log in to the edge FDF switch.

The N_Port_ID allocation reply may comprise a SW_ILS code, Primary FCM Switch_Name, Recipient FDF Switch_Name, Reserved element, Allocated N_Port_ID, FLOGI/FDISC LS_ACC, Number of allowed peers, and a plurality of Peer N_Port_IDs. The SW_ILS code, Recipient FDF Switch_Name, Primary FCM Switch_Name, and Reserved element may correspond to similar parameters found in the VLAN SW_ACC frame with the exception the reserved element is about one byte long. The Allocated N_Port_ID may specify the assigned identifier for the ENode. The FLOGI/FDISC LS_ACC, which may be about 116 bytes long, may specify the FCM response to the FLOGI/FDISC parameters sent by the N_Port_ID allocation request. The Number of allowed peers parameter, which may have a size of about four bytes, and may specify the number of N_Port_IDs with which the allocated N_Port_ID may communicate. The plurality of peer N_Port_IDs specify the N_Port_IDs that may communicate with the allocated N_Port_ID, and each Peer N_Port_ID entry may be about four bytes long. The list of peer N_Port_IDs may be provided for distributed zoning enforcement, which will be discussed later.

The N_Port_ID Deallocation request may comprise an SW_ILS code, Requesting FDF Switch_Name, Primary FCM Switch_Name, Logout N_Port_Name, a Flag element, and Logout N_Port_ID. The SW_ILS code, Requesting FDF Switch_Name, and Primary FCM Switch_Name are similar to the corresponding components found in the N_Port_ID allocation request. The Logout N_Port_Name may be about eight bytes long and may specify the N_Port that will be disconnected from the FCoE network. The Flag element may be about one byte and may indicate whether the logout is explicit or implicit. The Logout N_Port_ID may be about three bytes long and may reference the N_Port_ID that was deallocated or no longer being used.

Assignment of FDF_IDs may be accomplished using the primary FCM. FIG. 6 illustrates that for the FCoE network 600, FCM 601 has an N_Port_ID pool based on three Domain_IDs (3, 4, 5). Thus, the FCoE network 600 may have 196,608 ($3 \times 2^{16}$) potential N_Port_IDs to allocate to FDFs. To assign N_Port_IDs to FDFs 621 the N_Port_ID pool may be divided into N_Port_ID blocks. Assuming that N_Port_ID blocks may have a size of 512 ($2^9$) bytes, FCM 601 may create 384 ($3 \times 2^{16}/2^9$) N_Port_ID blocks. FCM 601 may reserve one or more of the 384 blocks to assign FDF_IDs. Persons of ordinary skill in the art will be aware that the N_Port_ID block sizes may not be equal.

N_Port_ID blocks may also be assigned to an FDF. For example, a block of N_Port_IDs ranging from 3.4.0 to 3.5.255 or 3.4.0 with prefix 15 (denoted as 3.4.0/15) may be assigned to FDF 621 (e.g. FDF A). Another block of N_Port_IDs 3.6.0/15 may be assigned to FDF 621 (e.g. FDF B). If the N_Port_IDs in a block is used up by an FDF 621, FCM 601 may assign a new block to the FDF 621. Persons of ordinary skill in the art will be aware that the N_Port_ID block sizes may not be equal.

After the FCoE network 600 has obtained FDF_IDs, FCM_IDs, and the network topology, FCM Y 601 may compute a base forwarding table for each of the FCM Y's 601 controlled FDFs 621. Base forwarding tables may provide route information from a source FDF to a destination node (e.g. FCM, FDF). FIG. 16 illustrates an embodiment of a base forwarding table 1600 for FDF A 621. The N_Port_ID Prefix column 1602 may specify the FDF_ID or FCM_ID to which an FDF may want to forward an FCoE frame. The Output port MAC column 1604 may designate the MAC address for the output port through which an FCoE frame will be forwarded. The Next hop Mac Column 1606 may specify the MAC address of the port in which the FCoE frame will be received. The Cost column 1608 designates the number of virtual links (e.g. link cost) the FCoE frame must travel from the source FDF to reach the destination node pointed to by N_Port_ID column 1602. For example, using row 1610 shown in FIG. 16, the N_Port_ID Prefix column 1602 specifies an N_Port_ID of 1.0.0/8. In FIG. 6, N_Port_ID 1.0.0 is assigned to FCM 601. The Output port MAC column 1604 contains FCF-MAC-A2 in row 1610, which may reference FDF A's 621 A2 port 612. As such, FDF A 621 will forward the FCoE frame from the A2 port 612. The Next hop MAC column 1606 for row 1610 contains FCF-MAC-Y1, which specifies FCM Y's 601 Y1 port 610. Therefore, the Y1 port 610 may be the destination port that receives the FCoE frame. Also, only one virtual link was used to forward the frame from the source port to the destination port, rendering the cost to be a value of one. Persons of ordinary skill in the art will be aware that a base forwarding table may be configured to have a plurality of entries with different combinations of costs and/or costs greater than two.

FCM Y 601 may compute a broadcast tree with FCM Y 601 as a root for efficient delivery of information (e.g. FFT request) to all FDFs 621. For FCoE frames sent via the broadcast tree, S_ID may equal FCM_ID and D_ID may equal FFFFFFh. FCM Y 601 may send base forwarding tables of FDFs 621 using the multi-hop approach discussed above (see FIG. 8) using the broadcast tree. After an FDF 621 receives an FFT request, the FDF 621 will populate the forwarding table (including the broadcast tree) with the information carried in the FFT request. The FDF base forwarding table may be periodically updated by FCM Y 601.

Figure 17:
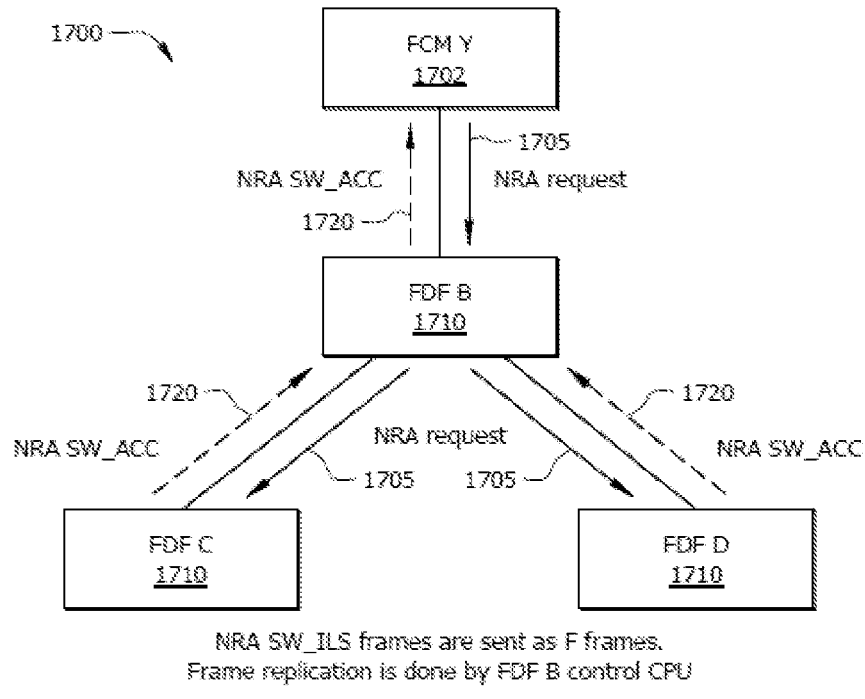
FIG. 17 is a schematic diagram of a framework of an embodiment of a process of sending and updating forwarding table information using broadcast tree.

There may be two methods to send base forwarding tables and updates to the forwarding table to FDFs using the broadcast tree. The first method is to send the forwarding table information to FDFs using the hop-by-hop approach via the FDF control plane. FIG. 17 illustrates an embodiment of a process 1700 of sending and updating forwarding table information using the broadcast tree. To send forwarding table information via the FDF control plane, S_ID and D_ID of the FFT request and N_Port_ID Range Allocation SW_ILS (NRA) request 1705 may be set to the fabric controller N_Port_ID (e.g. FFFFFDh). When an intermediate FDF B 1710 receives and forwards a FFT request or NRA request 1705 to downstream FDFs 1710 (e.g. FDF C and FDF D), FDF B 1710 may consume some Central Processing Unit (CPU) resources. The intermediate FDF B 1710 may use its control CPU to ensure downstream FDFs 1710 receive the FFT request or NRA request 1705 and notifies the FCM of receipt with FFT SW_ACC frame 1720. FFT SW_ACC frame 1720 is also sent back to FCM 1702 via the FDF control plane through FDF B 1710. If FDF 1710 does not receive SW_ACC frame from one of its downstream FDF 1710 after a few retries, FDF B 1710 may inform FCM 1702 which downstream FDF 1710 is not responding. The FFT request or NRA request 1705 may be sent as F frames.

Figure 18:
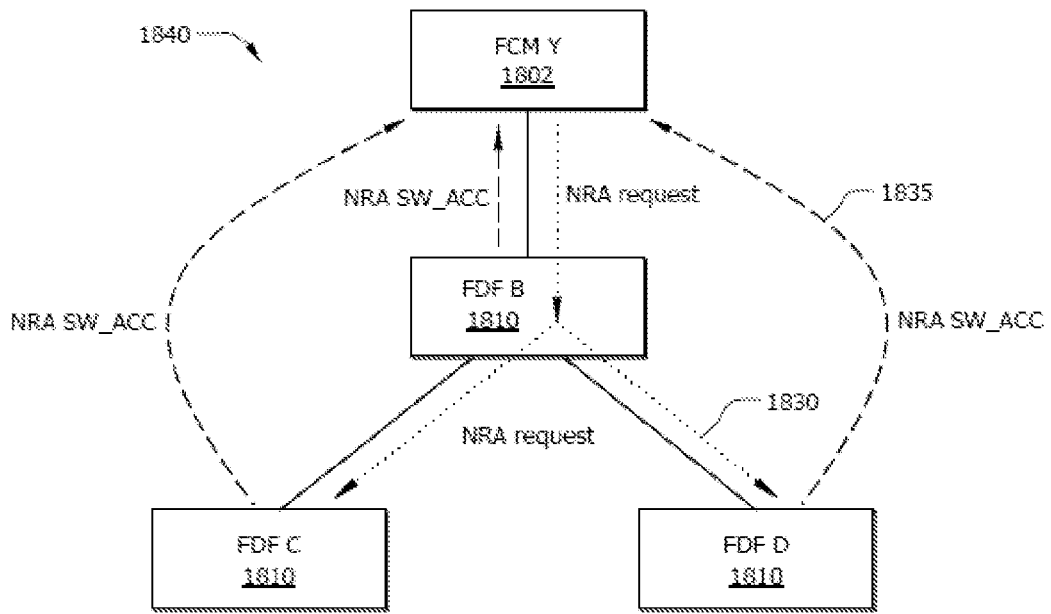
FIG. 18 is a schematic diagram of a framework of another embodiment of a process of sending and updating forwarding table information using broadcast tree.

Another method may involve sending the forwarding table to an FDF via a data path. FIG. 18 illustrates another embodiment of a process 1840 of sending and updating forwarding table information using the broadcast tree. The second approach, which sends the forwarding table via the data path, may set the S_ID to the FCM_ID of FCM Y 621 (e.g. 1.0.0) and $D_{\_ID\ to\ the\ FDF}$_ID of the FDF 621 that will receive the forwarding table. To forward tables on the data plane, intermediate FDF B 1810 may need to be ready to receive the FFT requests for downstream FDFs 1810 (e.g. FDF C and FDF D). To ensure an intermediate FDF 621 may be ready, the intermediate FDF B 1810 only replies with FFT_SW_ACC frame to FCM Y 1802 after configuring the data plane forwarding table for itself. Once the downstream FDFs 1810 receive FFT requests or NRA requests 1830, FFT SW_ACC frames or NRA SW_ACC frames 1835 may be sent back to FCM 1802 via the data plane. Each FDF may reply with SW_ACC frame to FCM 1802 after receiving the FFT request or NRA request 1830. If FCM Y does not receive a NRA SW_ACC frames 1835 reply from an FDF 1810, then the FCM Y 1802 may directly send a NRA request directly to the FDF using a unicast frame. Frames for the FFT request and NRA request 1830 may be sent as Class 3 frames.

FIG. 19 is a table describing the elements and size of an embodiment of the FFT request 1930. The FFT SW_ACC frame 1930 comprises a SW_ILS code 1960, Forwarding table entry length 1962, Payload length 1964, the Primary FCM Switch_Name 1966, Recipient FDF/FCM Switch_Name 1968, Broadcast tree uplink port MAC 1970, Number of broadcast tree downlink 1972, a plurality of Broadcast tree downlink port MAC 1974, Reserved element 1976, Number of forwarding table entries 1980, and a plurality of Forwarding table entries 1932. The SW_ILS code 1960, Payload length 1964, the Primary FCM Switch_Name 1966, and Reserved element 1976 is similar to the corresponding components of AIC_SW_ACC frame 1462 described in FIG. 14, except that the SW_ILS code 1960 is not set to 02h. The Forwarding table entry length 1962 may be about one byte and may specify the length of the forwarding table for forwarding table entry #1 to #h. The Recipient FDF/ FCM Switch_Name 1968 may be about eight bytes long and may specify the Switch_Name for the FDF or FCM that will receive the FFT request. The Broadcast tree uplink port MAC 1970 may be about six bytes and may specify the uplink port used to connect to the primary FCM. The number of broadcast tree downlink 1972 may be about 2 bytes and may specify the number of broadcast tree downlinks for the FFT request 1930. The broadcast tree downlink ports 1974 may be about six bytes long, and may specify the downlink ports that may be used to forward the FFT request 1930. The number of forwarding table entries 1980 may be about 4 bytes long and may specify the number of forwarding table entries 1932 for the FFT request 1930.

The forwarding table entry 1932 may comprise an N_Port_ID address 1982, Prefix length 1984, the output port MAC 1986, the Next port MAC 1988, Reserved element 1990 and the Cost Element 1992. The N_Port_ID address 1982 may be about three bytes and may specify the FDF_ID, FCM_ID or ENode N_Port_ID in which the recipient FDF may want to forward an FCoE frame. The prefix length 1984 may be about one byte long and may specify the prefix length associated with the N_Port_ID. The Output port MAC 1986 may be about six bytes and may specify the MAC address of the recipient FDF or FCM output port used to forward an FCoE frame. The Next hop Mac 1988 may be about six bytes and may specify the MAC address of the port that will receive the FCoE frame. The Reserved element 1990 is similar to the corresponding parts of the FFT request 1930. The Cost element 1992 may be two bytes long and may designate the number of virtual links an FCoE frame must travel from the recipient FDF to reach the destination node that may be specified in the N_Port_ID address 1982.

The FFT SW_ACC frame may be a default SW_ACC frame or it may comprise a SW_ILS code followed by the responding FDF Switch_Name and the primary FCM Switch_Name. The SW_ILS code is set to of 02000000h to establish that the frame is a SW_ACC frame.

An FCM may assign an N_Port_ID base block to each FDF. Using FIG. 6 as an example, a block of N_Port_IDs ranging from 3.4.0 to 3.5.255 or 3.4.0 with prefix 15 (denoted 3.4.0/15) may be assigned to one FDF A 621. Another block of N_Port_IDs 3.6.0/15 may be assigned to FDF B 621. If a FDF 621 uses up the N_Port_IDs in a block, FCM Y 601 may assign a new block to the FDF 621. The block sizes assigned to FDFs 621 may not be equal to each other.

A primary FCM may update a FDF base forwarding table by allocating or de-allocating a block of N_Port_IDs to the FDFs. For example in FIG. 6, FCM 601 may allocate N_Port_ID blocks 3.8.0/15, 4.2.0/15 and 4.4.0/15 to FDF C 621, FDF D 621, and FDF E 621, respectively. Thus, FDFs with: FDF_ID of 3.2.3 has been allocated N_Port_ID range of 3.8.0/15; FDF_ID of 3.2.4 has been allocated N_Port_ID range of 4.2.0/15, and FD_ID of 3.2.5 has been allocated N_Port_ID range of 4.4.0/15. FIG. 20 illustrates example of new entries 2000 added to the base forwarding table of FDF A 621 after receiving the update from FCM Y 601. The new entries may be based on the new N_Port_ID allocations. The updated forwarding table comprises of N_Port_ID Prefix column 2002, an Output port MAC column 2004, a Next hop MAC 2006, and a Cost column 2008, which may specify similar information that corresponds to components found in the base table 1600 (see FIG. 16).

To update the forwarding tables for FDFs 621, the FCM 601 sends N_Port_ID range allocation information to all FDFs, 621, as well as to FCM X 601, using a NRA request. When FDF 621 receives an NRA requests that provides information regarding the new allocated entries, FDF 621 may update its forwarding table with the six new entries 2000, three that are shortest paths entries with a cost of one and three paths with cost of two. After receiving an NRA request, each FDF may reply with NRA SW_ACC frames, which may comprise the default SW_ACC frame. The NRA request embodiment is discussed more in detail below.

Similar to FFT requests, NRA requests may be sent out to FDFs 621 using the broadcast tree computed by FCM Y 601. Additionally, FCM Y 601 may send NRA requests to all FDFs 621 and FCM X 601 periodically using the hop-by-hop approach. If any changes occur within the FCoE network between two periodical NRA requests (e.g. VN_Port with N_Port_ID equal to 4.2.1 is moved to FDF C), FCM Y 601 may send a NRA request with an incremental change to all FDFs 621 and FCM X 601 by setting a flag bit in the NRA frame.

FIG. 21 is a table describing the elements and size of an embodiment of NRA request. The NRA request 2130 comprises a SW_ILS code 2160, forwarding table entry length 2162, Payload length 2164, the Primary FCM Switch_Name 2166, reserved element 2168, Number of N_Port_ID ranges 2170, and a plurality of N_Port_ID range entries 2172. The SW_ILS code 2160, Forwarding table entry length 2162, Payload length 2164, the Primary FCM Switch_Name 2166, Reserved element 2168 are similar to the corresponding components of FFT request 1930 (see FIG. 19). The Number of N_Port_ID ranges 2170 may be about 2 bytes and may specify the number of N_Port_ID range entry 2172 for the NRA request 2130.

The N_Port_ID range entry 2172 may comprise a Flag element 2182, FDF_ID 2184, N_Port_ID address 2186, and Prefix length 2188. The N_Port_ID address 2186 and Prefix length 2188 may be similar to the corresponding components of the Forwarding table entries 1932 found in the FFT request 1930 (see FIG. 19) except that the N_Port_ID address 2186 and Prefix length 2188 may be used to reference the N_Port_ID block that has been allocated to a FDF by the primary FCM. The Flag element 2182, which may be about one byte long, may indicate whether the NRA request 2130 is a periodical frame or contains incremental changes. The FDF_ID 2184 may be about three bytes and may specify the FDF that has been assigned to the N_Port_ID block by the primary FCM. FDFs may update the forwarding table based on the information conveyed by the NRA request 2130.

FDFs may be allocated or de-allocated N_Port_ID blocks using the N_Port_ID allocation request and N_Port_ID de-allocation requests as discussed above. Allocating or de-allocating an N_Port_ID or N_Port_IDs may cause FDF forwarding tables to change. For example, when the first N_Port_ID of a new block is allocated, the route to this new block of N_Port_IDs needs to be added to the forwarding tables. When a second N_Port_ID is moved from one FDF to another FDF, the route to the second N_Port_ID needs to be added to the forwarding tables. In a third example, an N_Port_ID may be de-allocated, and thus the route needs to be removed from the forwarding tables. When allocation or de-allocation of N_Port_ID blocks occur, the primary FCM may send a NRA request via the broadcast tree. The FKA frames will be handled by FDFs locally. In case of explicit or implicit fabric logout, an FDF sends an N_Port_ID Deallocation request to the primary FCM, which will reply with a default SW_ACC frame.

To help the distributed zoning enforcement on FDFs after allocating or de-allocating an N_Port_ID or N_Port_IDs, the primary FCM may send a Zoning Access control list (ACL) Distribution SW_ISL (ZAD) request via the broadcast tree (see FIGS. 18 and 19) to all FDFs. Similar to NRA request, ZAD request may be sent as F frames or Class 3 frames (see FIGS. 18 and 19). The ZAD request may be sent to an FDF to check if the FDF has peer N_Port_IDs on the ZAD request list. If the FDF does have peer N_Port_IDs, then the ACL may set the peering N_Port_ID according to the information in the ZAD request. Using the Flag element, the ZAD request will indicate whether the peering N_Port_IDs may be allocated or de-allocated. Using FIG. 6 as an example, suppose for ENodes 630, N_Port_IDs 3.8.1 and 4.4.3 are in the same zone. To allocate N_Port_ID 3.8.1 to FDF C 621, FCM 601 Y may send the N_Port_ID allocation reply that may contain peer N_Port_ID 4.4.3. The N_Port_ID allocation reply may set the ACL rule such that frames that contain S_ID as 3.8.1 and D_ID as 4.4.3 will pass for FDF C. At the same time, FCM Y 601 may send the ZAD request via the broadcast tree. The ZAD request may contain peering entry where 3.8.1 is a peering N_Port_ID and 4.4.3 is another peering N_Port_ID. When FDF E receives the ZAD request, FDF 621 E may set the ACL rule that will pass frames that contain S_ID as 3.8.1 and D_ID as 4.4.3. FCM Y 601 may also send ZAD requests and NRA requests as unicast frames.

FCM Y 601 may also send a RSCN request to indicate a Fabric_Name change to all FDFs 621 using the broadcast tree. Once an FDF 621 receives the RSCN request, the FDF 621 forwards the RSCN request to the FDF's 621 registered VN_Ports (N_Ports) of an ENode 630. RSCN request may include a list to track registered VN_Ports (N_Ports) and zoning enforcement, similar to the ZAD request. Thus, when FDF 621 receives the RSCN request, only the VN_Ports (N_Ports) with the same zone(s) may be affected. FDF 621 may receive the RSCN request and may check whether FDF 621 may be attached to N_Port_IDs on the list supplied by the RSCN request. If FDF contains N_Port_IDs attached, then the FDF forwards the RSCN request to the ENode 630 with the N_Port_ID. An FDF may be configured to track registered VN_Ports and zoning enforcement.

Figure 22:
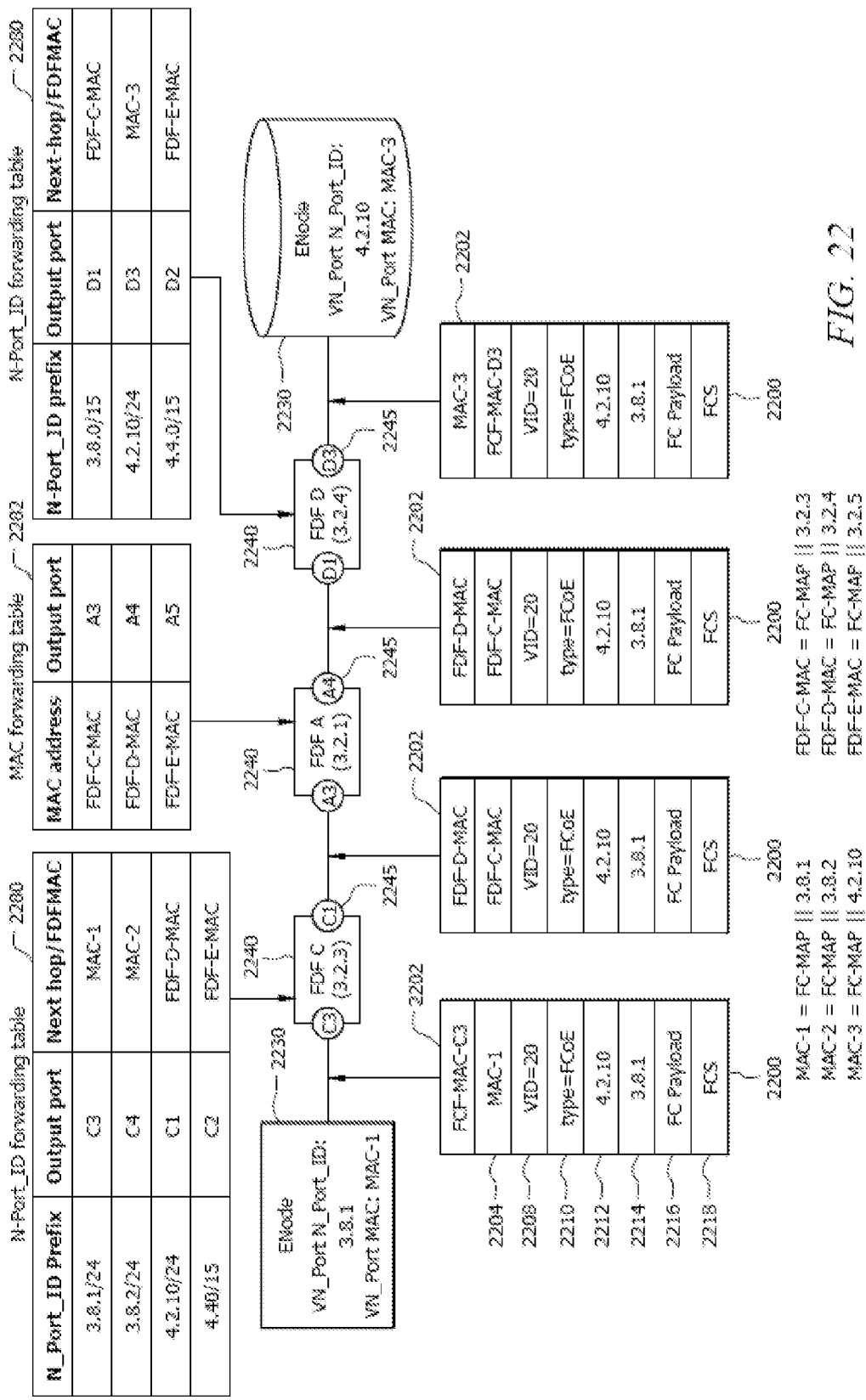
FIG. 22 is a schematic diagram of an embodiment of a framework that forwards a frame between switches.

FIG. 22 is a schematic diagram of an embodiment of a framework that forwards a frame between switches. In FIG. 22, an FCoE frame is sent from a first ENode 2230 with N_Port_ID of 3.8.1 to a second ENode 2230 with N_Port_ID of 4.2.10. Between the two ENodes 2230 are three FDFs 240 that are serially coupled to each other. FDF C 2240 and FDF D 2240 are edge FDFs, while FDF A 2240 is a core or intermediate FDF (N_Port_IDs for ENode 2230 and FDF 2240 also correspond to the N_Port_IDs shown in FIG. 6). Although FIG. 22 shows that only one intermediate FDF 2240 exists between FDF C 2240 and FDF D 2240, the FCoE network may have a plurality of serially coupled intermediate FDFs 2240 or other types of FCoE switches between edge FDF C 2240 and edge FDF D 2240. The FCoE network may not be limited to only FDF switches, but may include a plurality of other FCoE switches.

FIG. 22 illustrates that edge FDFs 2240 and the intermediate FDF 2240 may populate their forwarding table 2280, 2282 with FDF MAC addresses. The forwarding table 2280 and 2282 may be based on the information received from a FCM using a FFT request and NRA request. The edge FDFs 2240 (e.g. FDF C and FDF D) may populate their N_Port_ID forwarding table 2280 by replacing next hop MAC addresses with the MAC addresses of other edge FDFs 2240 (e.g. FDF-D-MAC), which may be coupled to ENodes 2230. Intermediate FDF 2240 may populate its MAC forwarding tables with FDF MAC address based on the information received from the primary FCM via FFT request and NRA request if ENodes 2230 are coupled to the intermediate FDF 2240. The MAC address of an FDF 2240 may comprise a FC-MAP address cascaded with the FDF_ID. For example, in FIG. 22, the FDF MAC address for FDF E (FDF-E-MAC) (FDF E is shown in FIG. 6) may be shown as FC-MAP II 3.2.5, where II means to cascade the two addresses. An FC-MAP may be set to 0EFC00h and cascaded with FDF_ID 3.2.5 (FDF E) to form a FDF MAC address 0E.FC.00.03.02.05. The MAC forwarding table 2282 for the intermediate FDF A 2240 may only populate the forwarding table 2282 with FDF MAC Address. The size of the MAC forwarding table 2282 for intermediate FDFs 2240 may be independent of allocating and de-allocating VN_Ports (N_ports) when intermediate FDFs 2240 are not connected to any ENodes. Therefore, intermediate FDFs 2240 may be FCoE agnostic when forwarding FCoE frames on the data plane (e.g. forwarding plane) based on destination MAC addresses.

Like standard Ethernet frames, the FCoE frame 2200 may comprise a destination MAC 2202, a source MAC 2204, VLAN ID 2208, frame type field 2210, D_ID 2212, S_ID 2214, FC payload 2216, and Ethernet FCS 2218. The destination MAC 2202 may specify the address of the destination port or destination FDF. The source MAC 2204 may provide the source address (e.g. MAC address for ENode, FDF or output port MAC address). The DID 2212 may specify the destination ENode's 2230 N_Port ID, while the S_ID 2214 may specify the source ENode's 2230 N_Port_ID.

ENode 2230 with N_Port ID 3.8.1 may attempt to send an FCoE frame 2200 via VN_Port to ENode 2230 with N_Port_ID 4.2.10. The FCoE frame 2200 sent by ENode 2230 (3.8.1) may have a destination MAC 2202 of FCF-MAC-C3 and source MAC 2204 of MAC-1. When FDF C 2240 receives the FCoE frame 2200 on the port C3 2245, FDF C 2240 may use the D_ID to perform a forwarding table look up. The N_Port_ID forwarding tables 2280 for edge FDFs 2240 (e.g. FDF C and FDF E) may have the next hop MAC replaced with edge FDF MAC address. The updating of the forwarding table 2280 may be based on information from FFT request and NRA requests. For example, when the edge FDF C 2240 receives a D_ID 2212 on the incoming FCoE frame 2200 that is not local (i.e. to another FDF 2240), the N_Port_ID forwarding table 2280 for FDF C 2240 may have already been configured where the next hop MAC is replaced by the FDF D 2240 MAC address. The N_Port_ID forwarding table 2280 for FDF C 2240 may reference the Next Hop address as FDF-D-MAC for N_Port_ID 4.2.10/24. Hence, FDF C 2240 forwards the FCoE frame 2200 out of port C1 2245 with a destination MAC 2202 of FDF-D-MAC. The FCoE frame is then sent to the intermediate FDF A 2240 via the A3 port 2245. FDF A 2240 forwards the FCoE frame based on the FDF MAC Address using the MAC forwarding table 2282. As stated earlier, FDF A 2240 may populate the MAC forwarding table 2282 using FDF MAC address. No changes may be made to the FCoE frame 2200 as it is forwarded to the edge FDF D 2240 using the A4 port 2245. At the edge FDF D 2240, the FCoE frame 2200 may be forwarded to the ENode 2230 (4.2.10) by using the D_ID to perform a forwarding table look-up. As such, the FCoE frame 2200 is forwarded from FDF D 2240 on port D3 2245 to ENode 2230 (4.2.10) via the VN_port.

Figure 23:
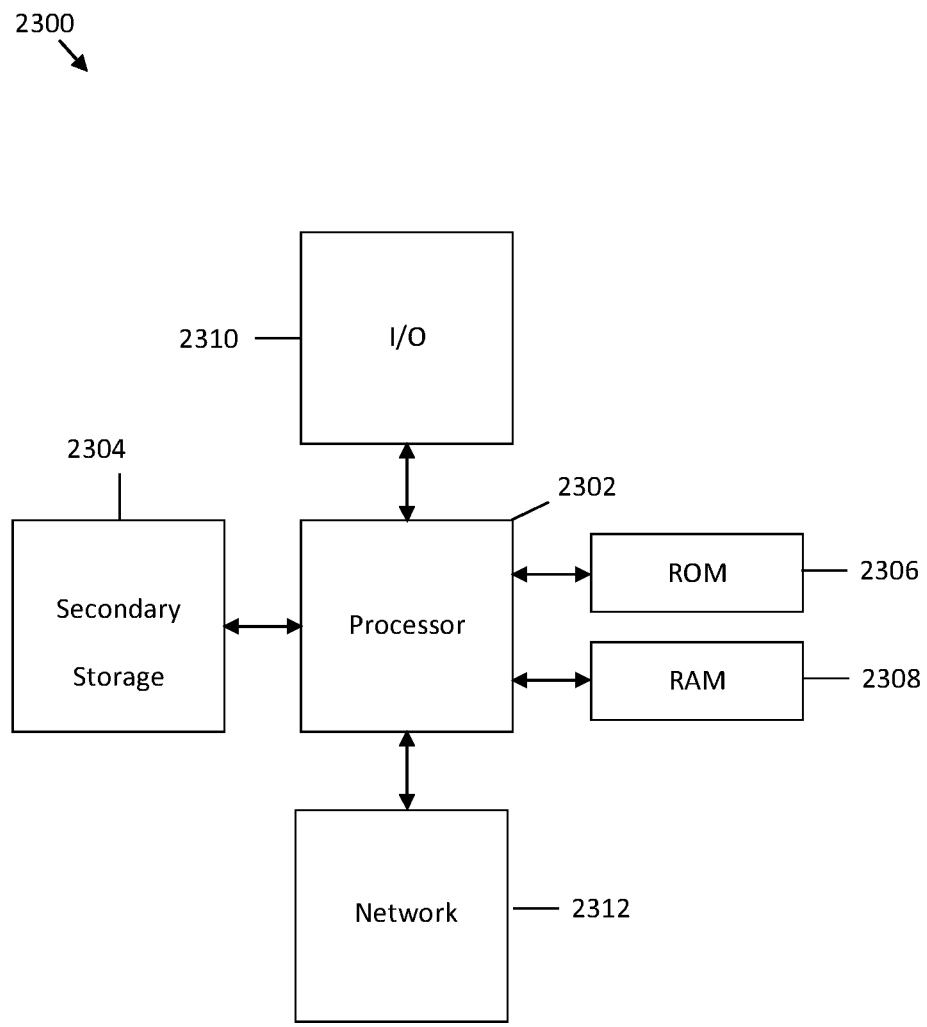
FIG. 23 is a schematic diagram of one embodiment of a general-purpose computer system suitable for implementing the several embodiments of the disclosure.

FIG. 23 illustrates a typical, general-purpose network component 2300 that may correspond to or may be part of a network component, such as a server, a switch, a router, or any other network nodes. The network component 2300 includes a processor 2302 (which may be referred to as a central processor unit or CPU) that is in communication with memory devices including secondary storage 2304, read only memory (ROM) 2306, random access memory (RAM) 2308, input/output (I/O) devices 2310, and network connectivity devices 2312. The general-purpose network component 2300 may also comprise, at the processor 2302 and or any of the other components of the general-purpose network component 2300.

The processor 2302 may be implemented as one or more CPU chips, or may be part of one or more application specific integrated circuits (ASICs) and/or digital signal processors (DSPs). The processor 2302 may comprise a central processor unit or CPU. The processor may be implemented as one or more CPU chips. The secondary storage 2304 is typically comprised of one or more disk drives or tape drives and is used for non-volatile storage of data and as an over-flow data storage device if RAM 2308 is not large enough to hold all working data. Secondary storage 2304 may be used to store programs that are loaded into RAM 2308 when such programs are selected for execution. The ROM 2306 is used to store instructions and perhaps data that are read during program execution. ROM 2306 is a non-volatile memory device that typically has a small memory capacity relative to the larger memory capacity of secondary storage 2304. The RAM 2308 is used to store volatile data and perhaps to store instructions. Access to both ROM 2306 and RAM 2308 is typically faster than to secondary storage 2304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is not required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A first fiber channel over Ethernet (FCoE) data forwarder (FDF), comprising:
    a memory coupled to a processor, wherein the memory comprises instructions that cause the processor to:
    receive a base forwarding table from an FCoE controller and manager (FCM), wherein the first FDF comprises a plurality of ports, and wherein the first FDF uses the base forwarding table to determine which of the ports to send a first FCoE data frame comprising fiber channel (FC) data;
    receive a second FCoE data frame comprising a media access control (MAC) address, a port identifier, and FC data; and
    update the base forwarding table using the MAC address and the port identifier.

2. The first FDF of claim 1, wherein the first FDF does not receive any base forwarding table updates from the FCM, and wherein updating the base forwarding table comprises adding an entry to the base forwarding table.

3. The first FDF of claim 1, wherein the FCM controls all control plane functions for an FCoE network comprising the FCM, the first FDF, and a second FDF, and wherein the FCM does not operate in a data plane such that the FCM does not send or receive any FCoE frames carrying fiber channel (FC) data.

4. The first FDF of claim 1, wherein the first FDF and a second FDF do not comprise any control plane functions, and wherein updating the base forwarding table comprises removing an entry from the base forwarding table.

5. The first FDF of claim 1, wherein the first FDF is configured to directly connect to the FCM, and wherein the first FDF is configured to directly connect to a second FDF such that the first FDF is positioned between the FCM and the second FDF, and wherein updating the base forwarding table comprises modifying an entry in the base forwarding table.

6. The first FDF of claim 5, wherein the base forwarding table comprises an entry comprising a prefix for one of one or more ports leading to the second FDF, a MAC address for a port leading to the second FDF, a next hop MAC address for the second FDF, and a cost of the next hop to the second FDF.

7. The first FDF of claim 6, wherein the second FDF is coupled to a third FDF such that the second FDF is positioned between the first FDF and the third FDF, and wherein the base forwarding table further comprises another entry comprising: a prefix for one of one or more ports leading to the third FDF; a MAC address for a port leading to the third FDF; a next hop MAC address for the third FDF; and a cost of the next hop to the third FDF.

8. The first FDF of claim 1, wherein the base forwarding table does not comprise a domain identifier.

9. A method comprising:
  receiving, by a first fiber channel over Ethernet (FCoE) data forwarder (FDF), a base forwarding table from an FCoE controller and manager (FCM), wherein the first FDF comprises a plurality of ports;
  selecting an output port of the plurality of ports to send a first FCoE data frame comprising fiber channel (FC) data in accordance with the base forwarding table;
  receiving a second FCoE data frame comprising a media access control (MAC) address, a port identifier, and FC data; and
  updating the base forwarding table using the MAC address and the port identifier.

10. The method of claim 9, wherein the FCM controls all control plane functions for an FCoE network comprising the FCM and the first FDF, and wherein the FCM does not send or receive any FCoE frames carrying fiber channel (FC) data.

11. The method of claim 9, wherein the first FDF and a second FDF do not comprise any control plane functions, and wherein updating the base forwarding table comprises removing an entry from the base forwarding table.

12. The method of claim 9, wherein the first FDF is configured to directly connect to the FCM, wherein the first FDF is configured to directly connect to a second FDF such that the first FDF is positioned between the FCM and the second FDF, and wherein updating the base forwarding table comprises modifying an entry in the base forwarding table.

13. The method of claim 12, wherein the base forwarding table comprises:
  an entry comprising a prefix for one of one or more ports leading to the second FDF;
  a MAC address for a port leading to the second FDF;
  a next hop MAC address for the second FDF; and
  a cost of the next hop to the second FDF.

14. The method of claim 13, wherein the second FDF is coupled to a third FDF such that the second FDF is positioned between the first FDF and the third FDF, and wherein the base forwarding table further comprises another entry comprising:
  a prefix for one of one or more ports leading to the third FDF;
  a MAC address for a port leading to the third FDF;
  a next hop MAC address for the third FDF; and
  a cost of the next hop to the third FDF.

15. The method of claim 9, wherein the base forwarding table does not comprise a domain identifier.

16. The method of claim 9 further comprising not receiving, by the first FDF, any base forwarding table updates from the FCM, wherein updating the base forwarding table comprises adding an entry to the base forwarding table.

* * * * *